US012746654B2

(12) United States Patent
Fisher

(10) Patent No.: US 12,746,654 B2
(45) Date of Patent: Sep. 29, 2026

(54) CAM OPERATED APPARATUS

(71) Applicant: RESONTECH LTD, London (GB)

(72) Inventor: Hugh Edward Fisher, Dalrymple (GB)

(73) Assignee: RESONTECH LTD, London (GB)

( * ) Notice: Subject to any disclaimer, the term of this patent is extended or adjusted under 35 U.S.C. 154(b) by 0 days.

(21) Appl. No.: 19/391,182

(22) Filed: Nov. 17, 2025

(65) Prior Publication Data

US 2026/0070206 A1 Mar. 12, 2026

Related U.S. Application Data

(63) Continuation of application No. 18/683,843, filed as application No. PCT/EP2022/073317 on Aug. 22, 2022, now Pat. No. 12,496,695.

(30) Foreign Application Priority Data

Aug. 23, 2021 (GB) ..................................... 2112073

(51) Int. Cl.
*B25D 11/10* (2006.01)

(52) U.S. Cl.
CPC ...... *B25D 11/102* (2013.01); *B25D 2250/045* (2013.01)

(58) Field of Classification Search
CPC ....... B25D 11/08; B25D 11/10; B25D 11/102; B25D 2250/045
See application file for complete search history.

(56) References Cited

U.S. PATENT DOCUMENTS

| | | | | |
|---|---|---|---|---|
| 1,505,493 | A * | 8/1924 | Roberts | B25D 16/00 173/205 |
| 1,666,981 | A * | 4/1928 | Somervell | E21B 1/34 173/205 |
| 2,051,053 | A * | 8/1936 | Morris | B25D 11/08 173/205 |
| 7,743,847 | B2 * | 6/2010 | Fisher | B25D 11/102 173/205 |
| 7,765,631 | B2 * | 8/2010 | Fisher | B23Q 11/08 15/93.1 |
| 8,307,912 | B2 * | 11/2012 | Fisher | B25D 11/102 173/205 |
| 8,789,619 | B2 * | 7/2014 | Fisher | B25D 11/005 173/205 |
| 12,496,695 | B2 * | 12/2025 | Fisher | B25D 11/08 |
| 2003/0106177 | A1 * | 6/2003 | Fisher | B23Q 11/08 15/93.1 |
| 2004/0035595 | A1 * | 2/2004 | Fisher | B25D 11/102 173/205 |

(Continued)

*Primary Examiner* — Andrew M Tecco
(74) *Attorney, Agent, or Firm* — LAW OFFICE OF JESSE D. LAMBERT, LLC

(57) ABSTRACT

A cam operated apparatus with a cam track and cam follower being engaged with one another, a head element such as a bit operatively connected to the cam track or cam follower means, and rotational drive means such as a motor operatively connected to the other, such that rotational drive causes reciprocal action of the head element and the width of the cam follower means is in the region of 91% to 99%, of the width of the cam track, to create a harmonic effect on the head element with low noise and increased power efficiency. Pin-in-wave and wave-in-wave arrangements are described along with tools including the cam operated apparatus.

20 Claims, 13 Drawing Sheets

(56) References Cited

U.S. PATENT DOCUMENTS

| | | | | |
|---|---|---|---|---|
| 2010/0089603 | A1* | 4/2010 | Fisher | F16H 25/12<br>173/205 |
| 2010/0300719 | A1* | 12/2010 | Fisher | B63B 59/08<br>173/205 |

* cited by examiner

CAM OPERATED APPARATUS

CROSS REFERENCE TO RELATED APPLICATIONS

This United States non-provisional patent application is a continuation of U.S. non-provisional patent application Ser. No. 18/683,843, filed Feb. 15, 2024, which is an application under 35 USC Sec. 371 of PCT/EP2022/073317, filed Aug. 22, 2022. Foreign priority is claimed to GB2112073.8, filed Aug. 23, 2021.

BACKGROUND OF INVENTION

The present invention relates to tools or power tools with reciprocating tool bits driven by rotary drive means and more particularly, though not exclusively, to cam operated apparatus for use in such tools.

A number of types of reciprocating power tools are in use for various tasks, e.g. scrapers, saws, hammers or the like. Commonly such tools are hydraulically or pneumatically powered; however, such powering necessitates use of a noisy and bulky compressor or the like in conjunction with the tool itself, resulting in a limited range of utility for such tools. Further, such tools cannot easily or efficiently attain high speeds of reciprocation.

An alternative arrangement is to convert rotary movement provided by, for example, an electric motor into reciprocating movement of the tool bit. One means for achieving this conversion is to use the motor to drive the rotation of a cam bearing a cam track, and to provide the tool bit with a pair of cam followers, which are a close fit within the cam track. As the cam rotates the cam followers are driven forward and backward along the cam track, which is typically a sinusoidal cam track, so driving the tool bit forward and backward. Such arrangements are described in GB 2 219 958 A and WO93/11910 by the same Inventor, the contents of which are incorporated herein by reference.

WO 01/60564 also by the same Inventor, the content of which is incorporated herein by reference, discloses a portable power tool, such as a hand-held marine growth removal scraper tool comprising a housing, a drive means and a mounting arrangement for a tool bit, wherein there is provided within the housing an output arrangement adapted to drive an output shaft in a reciprocal axial movement to drive the tool bit, and wherein the drive means is substantially sealed from external of the tool.

WO 02/14028 also by the same Inventor, the content of which is incorporated herein by reference, discloses a power tool comprising a housing, a rotary drive means, a cylinder cam having a cam track extending around a circumferential surface thereof, cam follower means adapted to run in said cam track, and a mounting arrangement for a tool bit, one of the cam and the cam follower means being driven by the drive means, and the mounting arrangement being associated with one of the cam and the cam follower means, such that actuation of the rotary drive means drives reciprocal movement of the mounting arrangement; and wherein at least part of the cam track is in the form of a wave having an amplitude and a wavelength, the wave providing a forward throw section and a rearward throw section which in use drive the mounting arrangement respectively forward and rearward, at least one of the forward throw section or rearward throw section imparting a greater forward or rearward acceleration respectively to the mounting arrangement than that imparted by a sinusoidal cam track of equivalent amplitude and wavelength.

WO2009004287 also by the same Inventor, the content of which is incorporated herein by reference, discloses a tool comprising a cam track (A) and cam follower means (B), wherein a width (WA) of at least a portion of the cam track (A) is greater than a width (WB) of the cam follower means (B). The cam follower means (B) is engaged within the cam track (A), the cam follower means (B) being adapted to run in/around the cam track (A) and be thrown between opposing walls (D, E) of the cam track (A). In use, the cam follower means (B) therefore has two degrees of motion, a first defined by the cam track (A), and a second defined by ricochet between opposing walls (D, E). The width of the cam follower means is less than 90%, of the width of the at least a portion of the cam track.

WO2009027678 also by the same Inventor, the content of which is incorporated herein by reference, discloses a tool a tool comprising a cam track (A) and cam follower means (B), wherein the cam track (A) comprises a first cam track wall means and the cam follower (B) comprises a first cam follower wall means, and the first cam track wall means (10) and first cam follower wall means face one another. The cam track (A) further comprises a second cam track wall means and the cam follower (B) comprise a second cam follower wall means, and the second cam track wall means and second cam follower wall means face one another. The first and second cam track wall means are disposed so as to face one another. The first and second cam follower wall means are disposed so as to oppose one another, e.g. back to back. The first/second cam track wall means comprise a first/second cam track wave. The second cam follower wall means comprise a first/second cam follower wave. In use, the cam follower means (B) therefore has two degrees of motion, a first defined by the cam track (A), and a second defined by ricochet between opposing walls (D, E). The width of the cam follower means is less than 90%, of the width of the at least a portion of the cam track. It will be realised that this tool is the equivalent of the tool of WO2009004287 wherein the cam follower means has walls equivalent to the cam track as opposed to pins.

The tool of WO2009004287 has been developed into a tool for removal of marine debris or encrustations, preferably without damaging the underlying substrate, e.g. hull. However, when operated, the tool was found to have excessive noise i.e. greater than 140 dB, and vibration levels which for workers using the hand-held or hand-guided power tool for more than a few hours each day are at risk of vibration white finger.

SUMMARY OF THE INVENTION

It is an object of at least one embodiment of at least one aspect of the present invention to obviate or at least mitigate one or more problems and/or disadvantages in the prior art. It is an object of at least one embodiment of at least one aspect of the present invention to provide an improved tool, e.g. a power tool, hand-held power tool, and/or scraper tool, e.g. marine anti-fouling tool.

According to a first aspect of the present invention there is provided cam operated apparatus comprising a cam track and cam follower means, wherein the cam track and cam follower means are engaged with one another, and the apparatus further comprises at least one head element operatively connected to one of the at least one cam track and the at least one cam follower means, and at least one rotational drive means operatively connected to the other of the at least one cam track and the at least one cam follower means, such that rotational drive causes reciprocal action of the head element and wherein a width of the at least one cam track is greater than a width of the at least one cam follower means and characterised in that:

the width of the cam follower means is in the region of 91% to 99%, of the width of the cam track.

The cam follower means has a confined fit within the cam track. This is in contradistinction to the early prior art wherein the cam follower means was a close or tight fit within the cam track. This is also in contradistinction to the later prior art wherein the cam follower means was a loose fit within the cam track. Such a spacing has been surprisingly found to lower the noise, vibration level and require a lower power supply to operate effectively. The cam track and cam follower means are engaged with one another, e.g. one within the other. Preferably the cam follower means is engaged within, or located in the cam track.

The cam follower means may be adapted to run in the cam track, e.g. move around the cam track and be thrown between opposing walls of the cam track.

The width of the cam follower means may be in the region of 93% to 97%, or 93% to 95% of the width of the cam track. In a preferred embodiment the width of the cam follower is 94% of the width of the cam track.

In use, when the head element is not placed against a work surface (unloaded), the cam follower means may follow a path dictated substantially only by the cam track.

The cam track and cam follower means may be such that, in use, when not placed against a work surface the cam follower means travels in a substantially straight path from one trough on one wall of the cam track to another trough on another wall of the cam track, preferably without intermediately striking the walls of the track.

In use, when placed against a work surface (loaded), the cam follower means may follow a path dictated by the cam track and by ricochet of the tool off the work surface and/or the cam follower means off walls of the cam track.

In the latter case the cam follower means therefore has two degrees of motion, a first degree of motion defined by the cam track, and a second degree of motion defined by ricochet between opposing walls of the cam track. It is noted that in the early prior art, the snug fit between the cam follower means and the width of the cam track, meant that there was little or no play between the cam follower means and the cam track, meaning that, in use, the cam follower means follows the track, having only one degree of freedom of movement. In the present invention, the two degrees of freedom are maintained.

The first degree of motion may have a frequency defined by the cam track. The second degree of motion may have a higher frequency than the frequency of the first degree of motion. The frequency of the second degree of motion may vary dependent upon the work surface to which the apparatus is presented. The first degree of motion may cause a substantially longitudinally throw of the head element. This may be considered as the pitch. In the present invention, the pitch is selected based on the function of the apparatus as it has been found that the effectiveness of the apparatus varies with the pitch and rpm of the cam.

The second degree of motion may cause a substantially longitudinal vibration or chatter of the head element. Due to the dimensional arrangement between the cam follower means and the cam track widths, a harmonic is set-up in use which greatly improves the performance of the apparatus.

The cam track may comprise a closed (circular) track, and may be provided on a cam cylinder body. In this arrangement, the cam track comprises a first cam track wall means facing a second cam track wall means. The first cam track wall means may comprise or provide a first cam track wave or waveform. The second cam track wall means may comprise or provide a second cam track wave or waveform.

The first cam track wall means may be rotationally or circumferentially continuous.

The first cam track wave may comprise a periodic waveform.

The first cam track wave may preferably comprise a sinusoidal waveform.

The second cam track wall means may be rotationally or circumferentially continuous.

The second cam track wave may comprise a periodic waveform. The second cam track wave may preferably comprise a sinusoidal waveform.

The cam follower means may comprise at least first and second parts assembled to provide a rotationally or circumferentially continuous cam follower.

The cam follower means may comprise at least one pin, and preferably at least one pair of opposing pins located circumferentially around the cam track.

The at least one pin may include a freely rotating roller bearing. In this way friction is reduced between the cam follower means and walls of the cam track. In an embodiment, the cam follower means comprises pairs of longitudinally separated pins arranged around the cam track, each pair being separated longitudinally parallel to the width of the cam track, the separated pairs of pins defining the width of the cam follower means. Preferably there are at least four pairs of longitudinally separated pins arranged around the cam track.

Preferably the cam track is sinusoidal wave or waveform, with the first cam track waveform and the second cam track waveform having the same frequency, amplitude and being in-phase. Preferably forward (first cam track waveform) and retreating (second cam track waveform) curves of the waves are of equal magnitude. In this way, the peaks and troughs in the cam track are identical. Alternatively, the forward wave has a sharper extended rise with the retreating wave following the sinusoidal wave. In this way, the cam follower means accelerate towards the forward end of the tool.

In an alternative embodiment, the cam follower means comprises a first cam follower wall means, and the first cam track wall means and first cam follower wall means face one another. The first cam follower wall means may comprise or provide a first cam follower wave or waveform. The first cam follower wall means may comprise or define a periodic waveform. The first cam follower wall means may comprise or define a sinusoidal waveform. The second cam follower wall means may be rotationally or circumferentially continuous.

In use, the first cam track wall means and first cam follower wall means may selectively abut, strike, ride over or upon, slide relative to, and/or contact one another.

In this way the first cam track wall means and first cam follower wall means may interact with, co-act or ride upon one another such that at least part of a motion of the cam track defines or determines at least part of a motion of the cam follower or vice versa.

The cam follower means may comprise a second cam follower wall means, and the second cam track wall means and second cam follower wall means may face one another.

The first and second cam track wall means may be disposed so as to face one another. The first and second cam follower wall means may be disposed so as to oppose one another, e.g. back to back. In such disposition the cam follower means may be provided within the cam track, e.g. between the first and second cam track walls. The second cam track wall means may comprise or provide a second cam track wave or waveform.

The second cam follower wall means may comprise or provide a second cam follower wave or waveform. The second cam follower wall means may comprise or define a periodic waveform. The second cam follower wall means may comprise or define a sinusoidal waveform. In use, the second cam track wall means and second cam follower wall means may selectively abut, strike, ride over or upon slide relative to and/or contact one another.

In this way the second cam track wall means and second cam follower wall means may interact with, co-act or ride upon one another such that at least a further part of a motion of the cam track defines at least a further part of a motion of the cam follower or vice versa.

Alternatively, the first cam follower wall means may be provided on a plurality of spaced cam follower members. In such case each cam follower member may define at least part of the first and/or second cam follower wall means and/or waves. Alternatively or additionally, the second cam follower wall means may be provided on the or a further plurality of spaced cam follower members.

A longitudinal distance between a peak of the first cam track wave and a peak of the second cam track wave may be less than a longitudinal distance between a peak of the first cam follower wave and a peak of the second cam follower wave.

In an implementation a period or frequency of the first and second cam track waveforms and first and second cam follower waveforms are substantially the same. The amplitude of the first cam track waveform and first cam follower waveform may be substantially the same. The amplitude of the second cam track waveform and second cam follower waveform may be substantially the same. In an embodiment all of the waveforms may have the same frequency and amplitude: peaks of the first and second cam track waveforms are circumferentially or radially coincident or longitudinally face one another; troughs of the first and second cam track waveforms are circumferentially radially coincident or longitudinally face one another; peaks of the first and second cam follower waveforms are circumferentially or radially coincident or longitudinally oppose one another being in-phase; and troughs of the first and second cam follower waveforms are circumferentially or radially coincident or longitudinally oppose one another being in-phase. The waveforms may have two peaks and two troughs.

In an alternative embodiment: the first and second cam track waveforms have the same frequency and amplitude; the first and second cam follower waveforms have the same frequency and amplitude; the frequency and amplitude of the first and second cam track waveforms are smaller than the frequency and amplitude of the first and second cam follower waveforms; the first and second cam track waveforms are out of phase with peaks of the first cam track waveform being radially coincident or longitudinally opposing troughs of the second cam track waveform; the first and second cam follower waveforms are in-phase with peaks and troughs of the first and second cam follower waveforms being circumferentially or radially coincident or longitudinally opposing peaks and troughs, respectively. The waveforms may have two peaks and two troughs; a distance between a peak of the first cam track waveform and a trough of the second cam track waveform may be twice the distance between peaks of the first and second cam follower waveforms.

Sides or walls of the cam track and/or the cam follower wall means may be substantially parallel or alternatively non-parallel. Preferably at least one wall is non-perpendicular to the cylindrical surface. This ensures that less friction is created when the cam follower means travels over the cam track wall means as points or lines of contact are made rather than surfaces which would provide heat build-up.

The apparatus may further comprise an adjustment mechanism, the adjustment mechanism configured to selectively change the width of the cam track. In this way, the width of the cam follower means can be adjusted within the range of 91% to 99% of the cam track width to 'tune' the apparatus when used in a tool in operation.

There may be a plurality of cam tracks and cam follower means. Such multiple arrangements improves the mechanical performance of the apparatus.

Preferably, the rotational drive means rotationally drives the cam track. In such instance the rotary motion of the cam track may be converted into reciprocal (longitudinal) motion of the cam follower means. Alternatively, the rotational drive means rotationally drives the cam follower means. In such instance the rotary motion of the cam follower means may be converted into reciprocal (longitudinal) motion of the cam track.

The cam track/cam cylinder may be made from a metallic material, e.g. phosphor bronze.

Preferably the rotational drive means is a motor such as an electric motor or alternatively a hydraulic or pneumatic motor.

Preferably the head element is a bit. The bit may be in the form of a chisel or blade.

According to a second aspect of the present invention there is provided a hand-held power tool, the power tool comprising a housing in which is arranged the apparatus of the first aspect, with the head element protruding from a first end of the housing; a power means to operate the rotational drive means; and wherein the head element is a tool bit mounted on an output shaft.

In this way, the power tool provides a reciprocating tool bit which can be used to remove material from a surface.

The power means may be an external electrical supply, e.g. mains electricity (e.g. 110V/240V) or by a low voltage supply (e.g. 12V), e.g. from a motor vehicle or vessel/boat. Alternatively, advantageously, the power tool may be battery powered e.g. by a battery pack.

Alternatively, the power tool may be hydraulically powered. Alternatively, the tool may be pneumatically powered, e.g. by compressed air.

The tool bit may be in the form of a blade, such like a scraper or chisel. In this way, the power tool may comprise a handyman's or tradesman's tool. There may be provided a plurality of interchangeable tool bits. The power tool may comprise a scraper, paint stripper, wall paper stripper, chisel, cold chisel, power spade, hammer or the like.

In an embodiment, the apparatus is configured to be driven from a known hand-held power drill. The apparatus including an engaging shaft opposite the output shaft to locate within a chuck of the hand-held power drill. In this way, a known power drill can be used to provide the invention. Alternatively, the power drill may be modified so that the apparatus is located between the chuck and the drive means. In this way the chuck can be used to attach interchangeable tool bits.

Preferably, the pitch is in the range 2.5 mm to 3.5 mm and more preferably is 3 mm. Preferably the rpm of the rotational drive means on the cam is in the range 3,500 rpm to 4,500 rpm and more preferably is 4,000 rpm. The pitch may be adjustable in use.

The features of the first aspect of the invention hereinbefore recited may be provided in the power tool of the second aspect either alone or in combination, with or without the features of the first aspect, which features are not recited herein again in full merely for reasons of conciseness.

Embodiments of the second aspect of the invention may include one or more features of the first aspect of the invention or their embodiments, or vice versa.

According to a third aspect of the present invention there is provided a marine tool, the marine tool comprising a housing in which is arranged the apparatus of the first aspect, with the head element protruding from a first end of the housing; a power means to operate the rotational drive means; and wherein the head element is a tool bit mounted on an output shaft and the housing is sealed to prevent fluid ingress to at least the rotational drive means.

In this way, a waterproof tool is realised which can be used underwater or in wet/moist environments. In a particularly advantageous embodiment the tool may comprise a marine growth removal or anti-fouling tool, e.g. barnacle scraper or hull scraper.

The marine tool may be configured to attach to and operate from an underwater vehicle such as an ROV or a crawler. A plurality of apparatus may be mounted upon the underwater vehicle and may share the power means.

The marine tool may further comprise one or more handles located upon the housing. In this way the marine tool can be a hand-held tool which can be used on surface or sub-surface by a diver, for example.

Preferably, the pitch is in the range 4.5 mm to 5.5 mm and more preferably is 5 mm. Preferably the rpm of the rotational drive means on the cam is in the range 4,300 rpm to 5,300 rpm and more preferably is 4,800 rpm. The pitch may be adjustable in use.

The features of the first aspect of the invention hereinbefore recited may be provided in the marine tool of the third aspect either alone or in combination, with or without the features of the first aspect, which features are not recited herein again in full merely for reasons of conciseness.

Embodiments of the third aspect of the invention may include one or more features of the first or second aspect of the invention or their embodiments, or vice versa.

According to a fourth aspect of the present invention there is provided a drill tool, the drill tool comprising the apparatus of the first aspect; the rotational drive means being via an axial tubular shaft through the apparatus; the head element around an end of the tubular shaft and including one or more ports for the passage of fluid passed through the tubular shaft to exit the apparatus; the head element being attached to an outer shroud around the apparatus to provide an annulus for the passage of ejected fluid to pass back to surface; and wherein rotation of the tubular shaft causes axial reciprocation of the head element and outer shroud to aid penetration while drilling.

In this way, the ejected fluid carries debris removed during the drilling action to surface.

Preferably, the head element includes a nose cone arranged over the end of the tubular shaft to penetrate the ground or other material being drilled through. In a further embodiment the axial tubular shaft extends through the head element, is mated relative thereto and has a drill head attached to an end thereof, such that rotation of the tubular shaft rotates the drill head while simultaneously reciprocating the drill head.

Preferably, the annulus is continued to surface between the axial tubular shaft and an outer tube connected to the axial tubular shaft to rotate therewith. The outer tube preferably has a diameter smaller than a diameter of the outer shroud, with a funnel end to provide a continuous annulus at the outer shroud. The outer shroud reciprocates while the outer tube rotates. More preferably, there is an Archimedes screw arranged in the annulus at the outer tube to assist in the movement of debris away from the head element.

The drill head may be retractable so that individual blades collapse radially towards a central axis. In this embodiment, the outer tube may be casing or liner of the same diameter as the outer shroud and is connected thereto; the outer shroud may disengage from the head element, so that removal of the tubular shaft and retracted drill head will leave the outer shroud and casing/liner in place. In this way, the drill tool can be used for casing drilling with the casing advantageously reciprocated to aid its insertion into a bore.

The features of the first aspect of the invention hereinbefore recited may be provided in the drill tool of the fourth aspect either alone or in combination, with or without the features of the first aspect, which features are not recited herein again in full merely for reasons of conciseness.

Embodiments of the fourth aspect of the invention may include one or more features of the first to third aspects of the invention or their embodiments, or vice versa.

According to a fifth aspect of the present invention there is provided a bucket tool for use with an excavator, the excavator comprising a boom, dipper (or stick), bucket and cab on a rotating platform which sits atop an undercarriage with tracks or wheels; which by the use of hydraulic fluid, with hydraulic cylinders and hydraulic motors, the bucket is manipulated to scoop up granular medium; wherein the bucket tool replaces the bucket as an articulating link closest to the bucket is replaced with apparatus according to first aspect, so as to cause reciprocal action to the bucket and ease its'passage through the granular medium.

In this way a standard excavator can be modified to include the present invention and thus by creating a vibrating action on the bucket this improves the ability of the bucket to dig into granular medium such as earth, soil, sand etc.

Preferably, the pitch is in the range 4.5 mm to 5.5 mm and more preferably is 5 mm. Preferably the rpm of the rotational drive means on the cam is in the range 3,000 rpm to 4,000 rpm, though this may be dependent on the size of the excavator and the weight of the bucket.

The features of the first aspect of the invention hereinbefore recited may be provided in the bucket tool of the fifth aspect either alone or in combination, with or without the features of the first aspect, which features are not recited herein again in full merely for reasons of conciseness.

Embodiments of the fifth aspect of the invention may include one or more features of the first to fourth aspects of the invention or their embodiments, or vice versa.

According to a sixth aspect of the present invention there is provided a powered spade tool, the spade comprising a housing in which is arranged the apparatus of the first aspect, with the head element protruding from a first end of the housing; a spade shaft and handle at an opposing end of the housing; a power means to operate the rotational drive means; and wherein the head element is a spade blade mounted on an output shaft.

In this way, a spade can include a reciprocating spade blade to assist in easing its passage through granular medium such as earth, soil, sand etc.

The spade blade may be flat or scooped. The spade blade may have a rounded or tapered cutting edge designed for digging. Alternatively, the spade blade may have with a square edge designed for scooping and shifting. The powered spade may be considered as a powered shovel.

The output shaft may be canted to provide optimum ergonomic benefit.

Preferably, the power means is by battery. An onboard detachable lithium battery pack can be mounted on the spade shaft. Alternatively, the battery may be placed in a back pack worn by a user with a cabled connection to the apparatus, preferably down the spade shaft.

The powered spade may further include an auxiliary handle mounted on the spade shaft. Such a handle allows a user to use both hands, one at the end of the spade shaft and one on the auxiliary handle to increase leverage in use.

The features of the first aspect of the invention hereinbefore recited may be provided in the powered spade tool of the sixth aspect either alone or in combination, with or without the features of the first aspect, which features are not recited herein again in full merely for reasons of conciseness.

Embodiments of the sixth aspect of the invention may include one or more features of the first to fifth aspects of the invention or their embodiments, or vice versa.

According to a seventh aspect of the present invention there is provided an adhered substance removal tool, the removal tool comprising a housing in which is arranged the apparatus of the first aspect, with the head element protruding from a first end of the housing; a suction extractor attached to the housing and arranged to catch the substance detached from a surface by action of the reciprocating head element and pass it through a hollow shaft to a collection unit; a power means to operate the rotational drive means; a vacuum to create the suction; a handle towards an end of the hollow shaft for an operator to position the tool in use and wherein the head element is a blade mounted on an output shaft.

In this way, adhered substances such as chewing gum and like matter can be scrapped from a surface and vacuumed up.

The hollow shaft may include a lockable joint to adjust the angle of the blade relative to the surface.

Preferably, the power means is by battery. An onboard detachable lithium battery pack can be mounted on the hollow shaft. Alternatively, the battery may be placed in a back pack worn by a user with a cabled connection to the apparatus, preferably down the hollow shaft. The vacuum and/or collection unit can also be contained in the back pack. In this way a user can walk around pavements and streets.

The removal tool may further include an auxiliary handle mounted on the hollow shaft. Such a handle allows a user to use both hands, one at the handle and one on the auxiliary handle to increase leverage in use.

The features of the first aspect of the invention hereinbefore recited may be provided in the adhered substance removal tool of the seventh aspect either alone or in combination, with or without the features of the first aspect, which features are not recited herein again in full merely for reasons of conciseness.

Embodiments of the seventh aspect of the invention may include one or more features of the first to sixth aspects of the invention or their embodiments, or vice versa.

According to an eighth aspect of the present invention there is provided a powered planting dibber, the dibber comprising a housing in which is arranged the apparatus of the first aspect, with the head element protruding from a first end of the housing; a shaft extending from an opposing end of the housing on which is arranged a bar perpendicular to the axis of the shaft; a power means to operate the rotational drive means; and wherein the head element is tapered and mounted on an output shaft.

In this way, when the dibber is plunged into earth, by gripping and pushing on the bar, to make a recess to insert a seedling or sapling, the vibratory action on the head element eases the penetration of the dibber into the soil.

The head element may be a cylindrical member having an arrow point. In this way a traditional dibber is used. The arrow point may be bevelled. Alternatively the head element may be a curved blade tapering to a point. In this way, a crescent shaped recess is formed which is easier to fill-in one the seedling/sapling is located therein. The head element may be detachable for easy replacement for heads of different dimensions and/or worn heads.

Preferably, the power means is by battery. An onboard detachable lithium battery pack can be mounted on the shaft. Alternatively, the battery may be placed in a back pack worn by a user with a cabled connection to the apparatus, preferably down the shaft.

The features of the first aspect of the invention hereinbefore recited may be provided in the powered planting dibber of the eighth aspect either alone or in combination, with or without the features of the first aspect, which features are not recited herein again in full merely for reasons of conciseness.

Embodiments of the eighth aspect of the invention may include one or more features of the first to seventh aspects of the invention or their embodiments, or vice versa.

In the description that follows, the drawings are not necessarily to scale. Certain features of the invention may be shown exaggerated in scale or in somewhat schematic form, and some details of conventional elements may not be shown in the interest of clarity and conciseness. It is to be fully recognized that the different teachings of the embodiments discussed below may be employed separately or in any suitable combination to produce the desired results.

Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

All singular forms of elements, or any other components described herein including (without limitations) components of the apparatus are understood to include plural forms thereof.

BRIEF DESCRIPTION OF THE DRAWINGS

Embodiments of the invention will now be described by way of example only, and with reference to the accompanying drawings, which are.

DETAILED DESCRIPTION OF THE PREFERRED EMBODIMENTS

Figure 1:
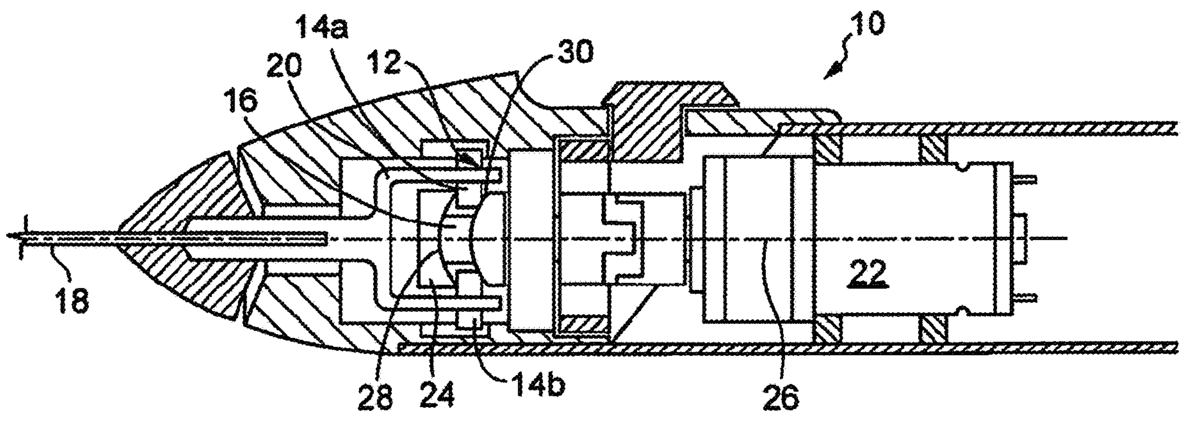
FIG. 1 is a schematic illustration of cam operated apparatus according to an embodiment of the present invention.

Referring initially to FIG. 1 of the drawings there is illustrated cam operated apparatus, generally indicated by reference numeral 10, showing cam follower 12 in the form of pins 14*a,b* located within a cam track 16; a head element 18 connected to the cam follower 12 via a yoke 20; a motor 22 to rotate the body 24 on which the cam track 16 is mounted; such that rotation of the body 24 causes the pins 14*a,b* to run in the cam track 16 and be moved reciprocally on the longitudinal axis 26 of the apparatus 10 and correspondingly move the head element 18. The cam follower 12 pins 14*a,b* have a width A, when measured parallel to the axis 26 which is selected to be in the region of 91% to 99% of the width B of the cam track 16, according to an embodiment of the present invention. Width A is measured at the widest extent of the cam follower and width B at the narrowest of the cam track, see FIG. 2. This may be referred to as a 'pin-in-wave' arrangement.

Figure 2:
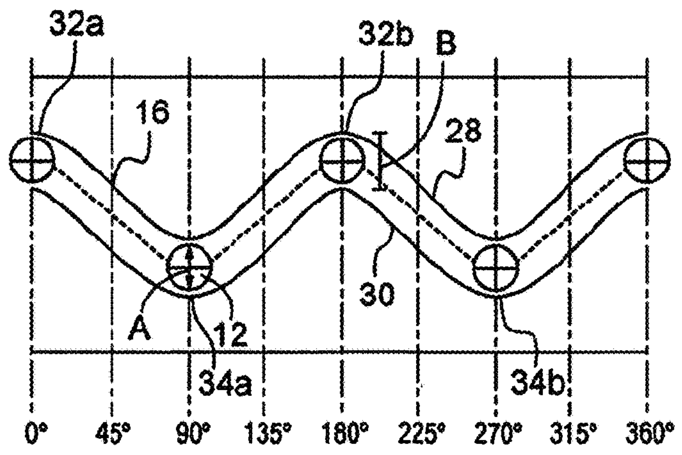
FIG. 2 is a diagram illustrating a path of the cam follower in the cam track for the cam operated apparatus of FIG. 1, when a head element is not applied to a work surface.

A path of a cam follower 12 pin 14*a* is illustrated in FIG. 2. Cam track 16 has a forward wall 28 and a retreating wall 30 defining a sinusoidal waveform around the body 24. The cam track 16 provides peaks 32*a,b* and troughs 34*a,b* which define a pitch P for the reciprocal motion of the cam follower 12 as the distance between a peak 32*a* and a trough 34*a* minus the width A. It is seen that the width A of the cam follower 12 is such that it can move both vertically and horizontally within the cam track 16 of width B to a certain degree.

In the early prior art, the cam follower 12 was a snug fit in the cam track 16 as both had substantially the same fit. This meant there was little or no play between the cam follower 12 and the cam track 16 and the cam follower 12 would exactly follow the track 16 shown as a dotted line in FIG. 2, having only one degree of freedom of movement. Although tools according to this early prior art were found to be an improvement, further improvement is desirable, particularly in using such a tool in robust uses, e.g. as a marine scraper. Later prior art taught of a cam follower 12 with a width A below 90% of the width B of the cam track 16, providing a loose fit with enormous play between the cam follower 12 and the cam track 16 causing the cam follower 12 to ricochet between the walls 28,30 of the cam track 16, in use, by having two degrees of freedom of movement. However, while such ricocheting of the cam follower 12 created advantageous vibration in the head element, the path of the cam follower 12 in the cam track 16 could vary greatly and thus could become uncontrollable. Tools based on this prior art arrangement were thus found to be noisy with high vibration and inefficient.

For the present invention, the width A of the cam follower 12 is selected to be in the region of 91% to 99% of the width B of at least a portion of the cam track 16. In use, when the head element 18 is not placed against a work surface, the cam follower 12 follows a path, see dotted line in FIG. 2, dictated substantially only by the cam track 16.

Figure 3:
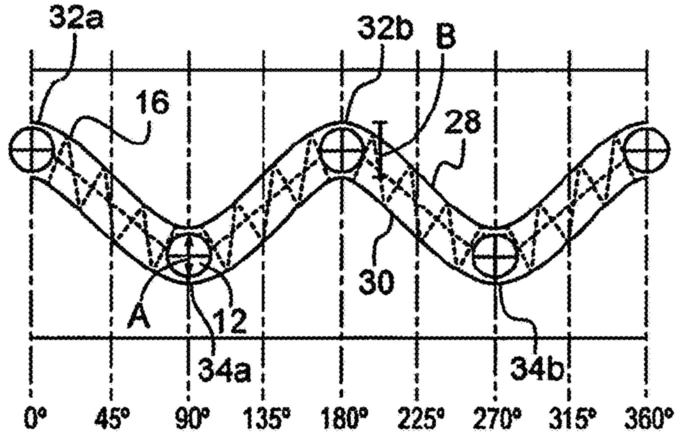
FIG. 3 is a diagram illustrating a path of the cam follower in the cam track for the cam operated apparatus of FIG. 1, when a head element is applied to a work surface.

In use, when the head element 18 is placed against a work surface, the cam follower 12 follows a path dictated by the cam track 16 and by ricochet of the head 18 off the work surface, and/or the cam follower 12 off walls of the cam track 16—see FIG. 3. In the latter case the cam follower 12 therefore has two degrees of motion, a first degree of motion defined by the cam track 16, and a second degree of motion defined by ricochet between opposing walls 28,30 of the cam track 16. The second degree of motion may be termed "chatter". This "chatter" is more limited than in the later prior art.

The first degree of motion has a frequency defined by the cam track 16. The second degree of motion has a higher frequency than the frequency of the first degree of motion. The frequency of the second degree of motion typically varies dependent upon the work surface to which the head 18 is presented. The second degree of motion may therefore be "self-tuning", dependent upon the hardness of the work surface. The first degree of motion causes a substantially longitudinally throw of head 18, defined as the pitch. The second degree of motion causes a substantially longitudinal vibration or chatter of the head 18 which in use, causes a harmonic to be formed which improves the performance of the head 18. Hence, in the present invention, by having the cam follower 12 width A be between 91% and 99% of the cam track 16 width B, the second degree of movement is still available but is more controlled, confined and bounded. An optimum effect is produced for a cam follower 12, being 94% of the width of the cam track A. A 6% gap still provides the "ricochet" effect between the walls of the track in rotation of the cam. Further selecting the pitch or throw of the arrangement, i.e. amplitude of the waveform of the cam track 16, together with the rpm of body 24, for different head elements 18 provides optimum conditions for different intended uses.

Figure 4:
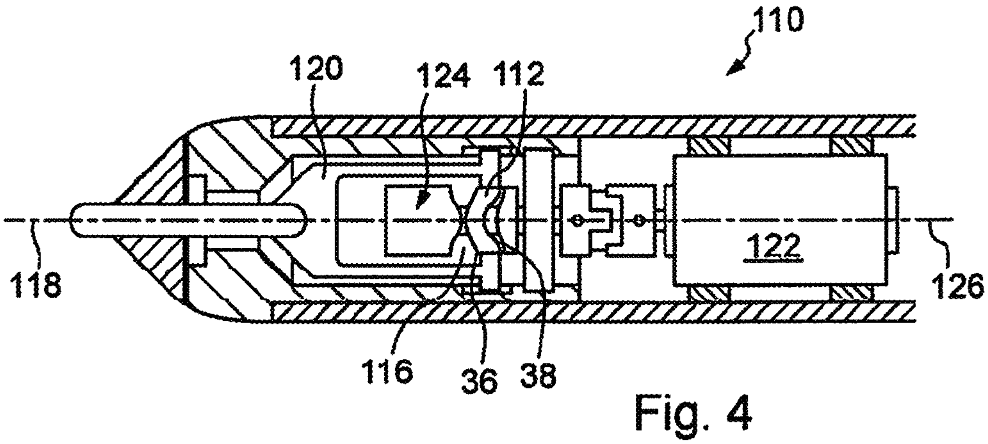
FIG. 4 is a schematic illustration of cam operated apparatus according to a further embodiment of the present invention.

Referring now to FIG. 4 of the drawings there is illustrated cam operated apparatus 110, with like parts to those of FIG. 1 given the same reference numeral with the addition of 100 Cam operated apparatus 110, has a cam follower 112 in the form of a cylindrical body with ends providing a forward wall 36 and a retreating wall 38 located within a cam track 116; a head element 118 connected to the cam follower 112 via a yoke 120; a motor 122 to rotate the body 124 on which the cam track 116 is mounted; such that rotation of the body 124 causes the cam follower 112 to run in the cam track 116 and the yoke 120 to be moved reciprocally on the longitudinal axis 126 of the apparatus 110 and correspondingly move the head element 118. The cam follower 112 is a sinusoidal waveform having a uniform width A being the distance between the walls 36,38 when measured parallel to the axis 126 and is selected to be in the region of 91% to 99% of the width B of the cam track 116, which is taken as the smallest distance between the walls 128, 130 according to an embodiment of the present invention. This may be referred to as a 'wave-in-wave' arrangement.

Figure 5A:
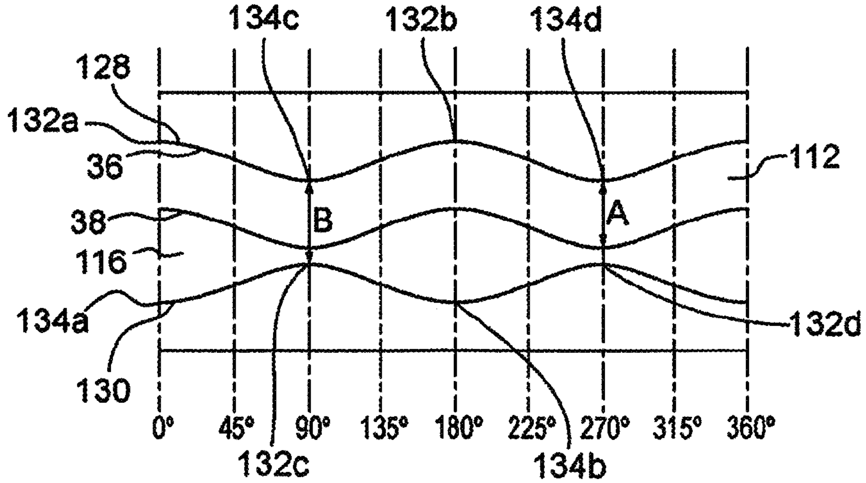
FIGS. 5(*a*) and 5(*b*) illustrate the cam follower and the cam track for the cam operated apparatus of FIG. 4 in first and second positions, respectively.
Figure 5B:
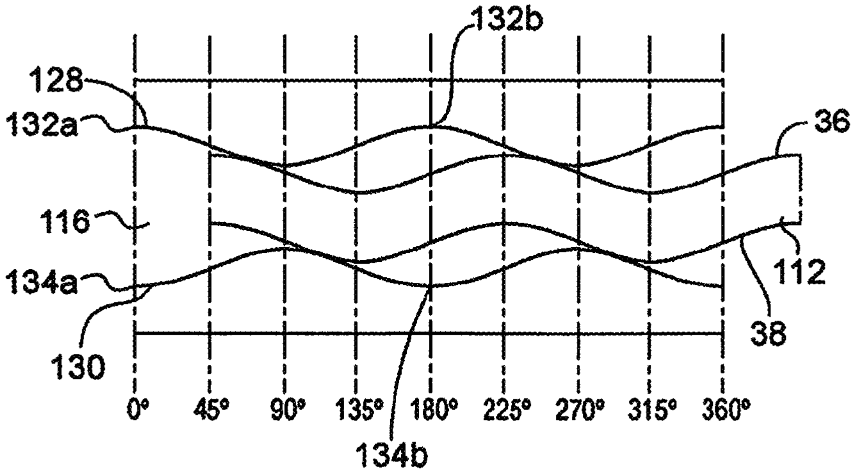

FIGS. 5(*a*) and 5(*b*) illustrating the cam follower 112 moving in relation to the turning body 124 of the cam track 116. Cam track 116 has a forward wall 128 and a retreating wall 130 each defining a sinusoidal waveform around the body 124. Of note is that the waveforms are out of phase so that the peaks 132*a,b* of the forward wall 128 are aligned with the troughs 134*a,b* of the retreating wall 130. The width of the cam track 116 is thus defined as the distance between the troughs 134*c,d* of the forward wall 128 and the peaks 132*c,d* of the retreating wall. The pitch P for the reciprocal motion of the cam follower 112 will be the distance between the peak 132*a* of forward wall 128 and the peak 132*c* of the retreating wall 130 minus the width A. It is seen that the width A of the cam follower 12 is such that it can move both vertically and horizontally within the cam track 16 of width B to a certain degree.

The cam follower 112 is retained within the cam track 116 and the diameter of the body 124 is the same as the diameter of the cam follower 112. Cam track forward wall 128 faces cam follower forward wall 36 and cam track retreating wall 130 faces cam follower retreating wall 38. The walls 128, 130,36,38 provide periodic waveform's which are rotationally or circumferentially continuous around the body 124.

In use, the cam track walls 128,130 and cam follower walls 36,38 respectively, selectively contact, abut or slide relative to, ride upon and/or contact one another. In this way the cam track walls 128,130 and cam follower walls 36,38 in use, interact with or upon one another such that at least part of a motion (e.g. rotational motion) of the cam track 116 defines at least part of a motion (e.g. longitudinal motion) of the cam follower 112 or vice versa.

As for the first embodiment, the width A of the cam follower 112 is in the region of 91% to 99% of the width B of the cam track 116. The width A of the cam follower 112 may be in the region of 93% to 97%, or 93% to 95% of the width B of the cam track 112. In a preferred embodiment the width of the cam follower is 94% of the width of the cam track. At 94%, this gap size has been found to be a sweet spot, setting up a controlled harmonic like effect which acts on the head element in addition to the reciprocal action. The harmonic like effects can be matched with known rotational wave speeds to produce positively enhanced performance in tools with head element types dedicated to specific works.

This 'wave-in-wave' arrangement works in the same manner as that for the 'pin-in-wave' arrangement of FIGS. 1 to 3. The 'wave-in-wave' arrangement gives a greater contact between the cam follower 112 and the cam track 116 walls 36,38,128,130, which allows for increased pressure loads on this configuration. While FIGS. 1 and 4 show the cam track 16,116 on a cylindrical body 24,124 which is driven to rotate by the motor 22,122, it will be appreciated that the motor 22,122 to be attached to the cam follower 12,112, and body 24,124 be reciprocating longitudinally and attached to the head element 18,118.

Figure 6:
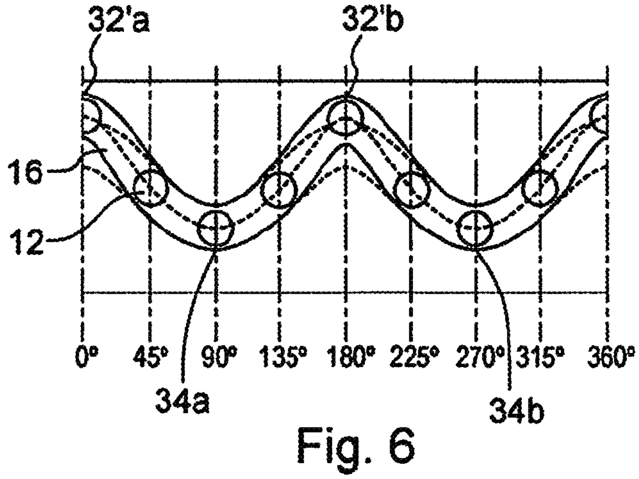
FIG. 6 is a diagram illustrating a modified shape to the cam track of FIG. 2, according to an embodiment of the present invention.

In FIG. 2, the cam track 16 is seen as a regular sinusoidal wave with the path of cam followers 12 of diameter 10% or less than the width between the walls 28,30 of the wave. The forward and retreating curves of the wave are of equal magnitude. The forward curves are at peaks 32*a,b* and the retreating curves are at troughs 34*a,b*. FIG. 6 shows a modified shape to the drive wave of the cam track 16 according to an embodiment of the present invention. The regular sinusoidal base shape is shown as a dotted line. The cam track 16 has a modified drive wave shape such that the retreating curve 34*a,b* of the wave remains as in the sinusoidal wave of FIG. 2, but the forward wave 32'*a,b* is given a sharper extended rise in order to accelerate the head element 18 driven by the cam followers 12 as it moves forward. The diameter of the cam followers 12 remains constant as in FIG. 2. This change in drive wave shape has the effect of increasing the "pecking" action of the head element enhancing the harmonic like effect of a tool in use.

Figure 7:
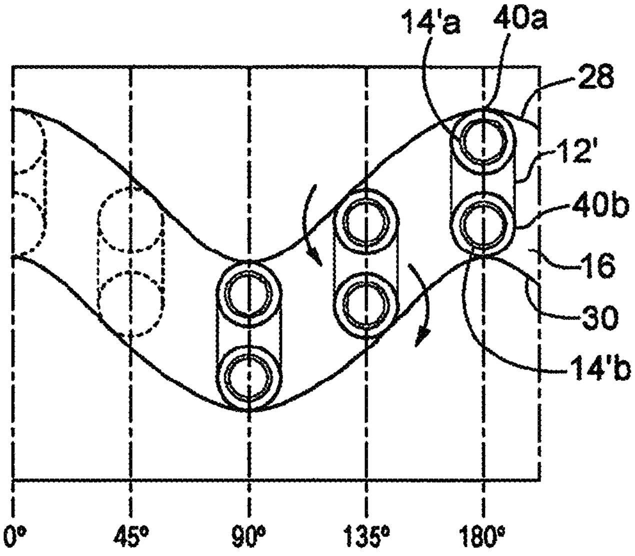
FIG. 7 is a schematic illustration of twin cam followers according to an embodiment of the present invention.

A further enhancing embodiment is shown in FIG. 7 with the use of twin yoke mounted rotating followers 12'. In order to increase the robustness of the mechanism the cam followers 12' have been doubled in number to provide dual pins 14'*a,b* separated to extend over width A in place of the individual pins 14*a* in FIGS. 2 and 6. Further the pins 14'*a,b* are equipped with freely rotating roller bearings 40*a,b*. When in contact with the cam track walls 28,30, then the bearings 40*a,b* will rotate counter clockwise to each other, indicated by arrows in FIG. 7, as they roll across the cam track wall 28,30. This results in a particularly smooth fluid action considerably reducing friction between the followers 12' and the cam track wall 28,30.

Figure 8A:
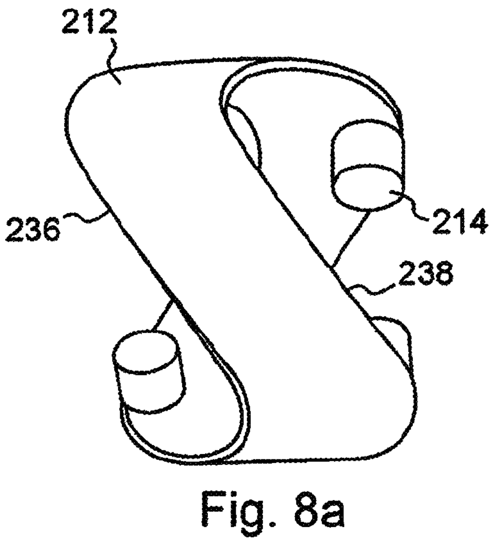
FIGS. 8(*a*) and 8(*b*) are schematic illustrations of combined wave and pin cam followers with (a) round pins and (b) shaped pins according to embodiments of the present invention.
Figure 8B:
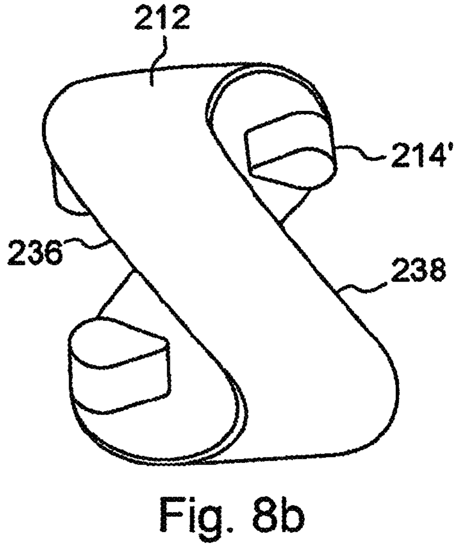
Figure 9A:
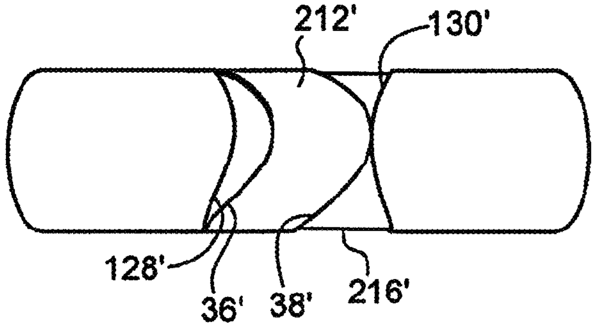
FIGS. 9(*a*)-(*d*) are schematic illustrations showing the relationship of a cam follower in a cam track progressively as the cam track body is rotated, according to an embodiment of the present invention.
Figure 9B:
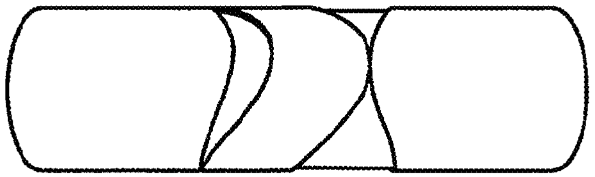
Figure 9C:
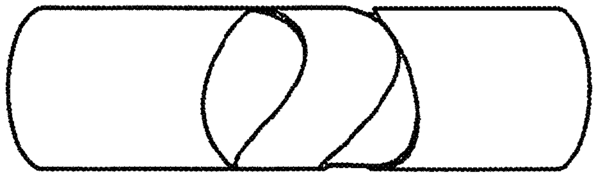
Figure 9D:
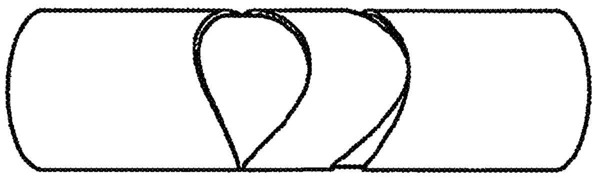

The cam follower 12,112 can also combine the pin 14 and wave formed between walls 36,38 arrangements. FIG. 8(*a*) shows a cam follower 212 which has pins 214 mounted at the apex of each waveform of walls 236,238. This arrangement makes it possible to have four load bearing followers running in one cam wave track thus reducing working loads, though the number of pins will be dependent on the period/frequency of the waveforms selected. Freely rotating rollers may be fitted to each pin 214 to improve and smooth the running of the apparatus 10. Alternatively, the circular pins 214 can be replaced with shaped pins 214' as shown in FIG. 8(*b*). It is noted that the pins 214 are subject to wear and stress on one side only as they contact the cam track walls, thus only half the pin needs to be circular to make any running contact with the cam track wall. The remaining half of the pin 214' can be shaped to provide an extended contact area for fixing to the inner face of the cam follower 212 body.

Friction reducing measures can also be applied to the 'wave-in-wave' arrangement. The simplest is to not have contacting walls 128,36, 130,34 parallel to each other. If one set of the walls, for example the cam track walls 128,130, are non-orthogonal to the cylindrical body 24 then a line of contact is provided instead of an area. Considering FIGS. 5(*a*) and 5(*b*) again, the waveform of the walls 36,38 of the cam follower 112 exactly matched the waveform of the walls 128,130 of the cam track 116. If the cam follower 112 is fixed in position, then the cam walls 128,130 are pushed apart if they are to rotate in unison. FIG. 9(*a*)-(*d*) show a modified cam follower 112' within a cam track 116'. The walls 128',130' of the cam track 116' have identical sinusoidal waveforms. The walls 36',38' of the cam follower 112' also have identical sinusoidal waveforms but their amplitude is double that of the cam track 116' waveforms, for the same period/frequency. This arrangement allows either the cam track walls 128',130' or the cam follower 112' to be rotated freely around the opposite fixed structure with reduced friction as contact is only occurring at the peaks 32' and troughs 34' of the cam follower 112'. The period/frequency of the waveforms can be increased but must be equal for both the cam track 116' and the cam follower 112'. Additionally, the reverse arrangement of the cam follower walls 36',38' having waveforms of a smaller amplitude than that of the cam track walls 128',130' would also work, but would provide a smaller pitch.

Figure 10A:
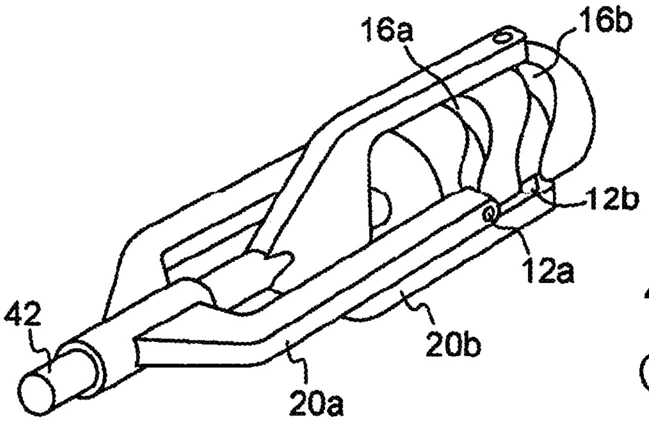
FIGS. 10(*a*) and 10(*b*) are schematic illustrations of dual cam tracks and cam followers with (a) double yoke and (b) single yoke mountings, according to an embodiments of the present invention.
Figure 10B:
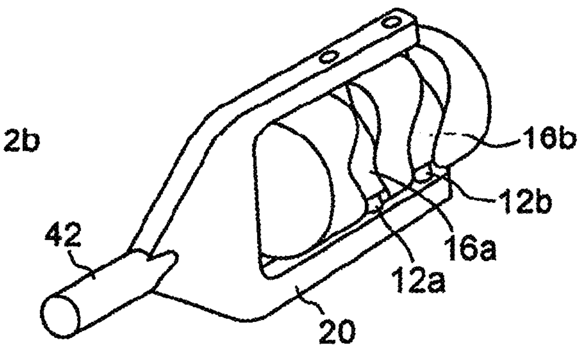

It will be apparent that the cam tracks can be multiplied up to increase robustness in the apparatus. FIGS. 10(*a*) and 10(*b*) show dual cam tracks 16*a,b* and cam followers 12*a,b*. On FIG. 10(*a*) two yokes 20*a,b* are provided which combine on a co-axial shaft 42 leading to the head element (not shown). In FIG. 10(*b*), the cam followers 112*a,b* are located on a single yoke 20.

Figure 11:
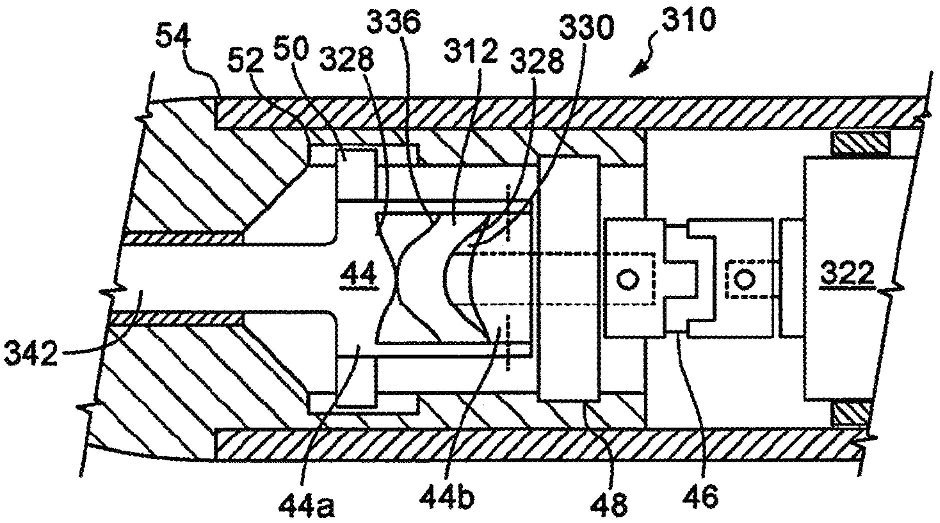
FIG. 11 is a schematic illustration of cam operated apparatus according to a further embodiment of the present invention.

FIG. 11 shows a wave-in wave cam operated apparatus 310 according to a further embodiment of the present invention. Apparatus 310 now has the inner wave, previously cam follower 312, as being rotated by the motor 322 with a shock absorbing coupling 46 and thrust race 48 mounted therebetween. The cam track is now formed within a cam drum 44*a,b* with inner cam track wall 328,330 facing the respective walls 336,338 of the inner wave 312 contained therein. The cam drum 44 connects to a shaft 342 leading to the head element (not shown). The cam drum 44 has wings 50 on an outer surface which engage in slots 52 of a housing 54 to prevent rotation of the cam dram 44 and limit it to reciprocal longitudinal motion only. This is the reverse arrangement to the apparatus 110 of FIG. 4.

Figure 12A:
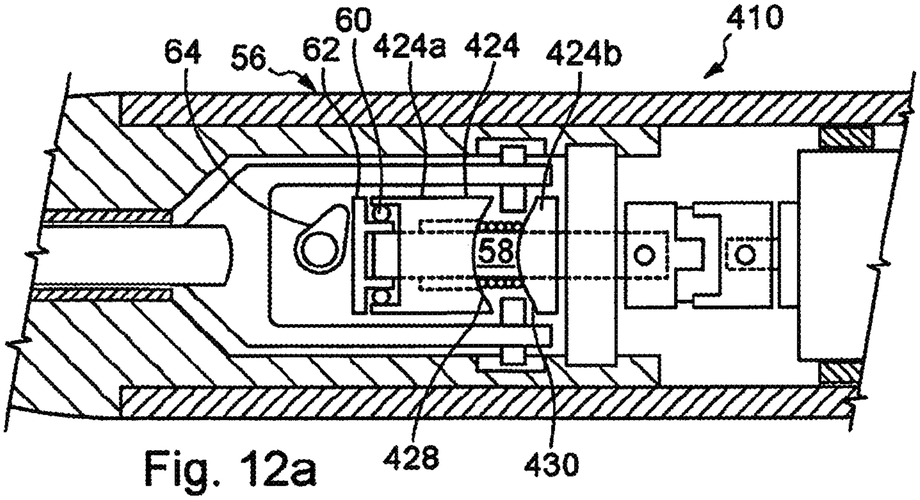
FIGS. 12(*a*) and 12(*b*) are schematic illustrations of cam operated apparatus in (a) vertical section and (b) horizontal section according to a further embodiment of the present invention.
Figure 12B:
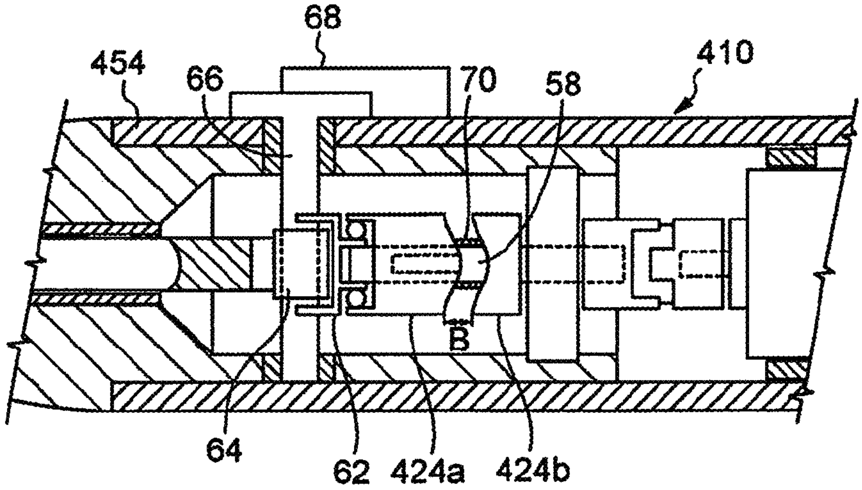

In all the embodiments, the width A is maintained as 91% to 99% of the width B with the ideal position being at 94%. To ensure this is the case and this 'sweet spot' is identified, the cam operated apparatus 10, 110, 210, 310 may include an adjustment mechanism to change the cam track width and effectively tune the apparatus to create the desired harmonic effect. Referring to FIGS. 12(*a*) and 12(*b*) there is illustrated a cam operated apparatus 410 adapted to include an adjustment mechanism 56 according to a further embodiment of the present invention. A pin-in-wave arrangement is shown with like parts to those of FIG. 1 having the same reference numeral with the addition of 400. In this embodiment the body 424 is now in two parts 424*a,b* so that the forward part 424*a*, carrying the forward cam track wall 428 is keyed to slide onto a cam shaft 58 carrying the other part 424*b* with the reverse cam track wall 430. Ball race 60 on cam shaft 58 at end of body part 424*a* allows body part 424*a* to rotate with cam shaft 58 but provides a fixed plate 62 for an eccentric cam 64 to push against. The eccentric cam 64 is located on a through shaft 66 to provide a connection to the outside of the housing 454. The fixed plate 62 is pinned to the through shaft 66 to prevent rotation when the cam shaft 58 is rotated. The through shaft 66 leads to a vernier screw adjustment 68 to control rotation of the eccentric cam 64. Such adjustment rotates the eccentric cam 64 to push against or release from the fixed plate which is biased towards the eccentric cam 64 by a spring 70 mounted on the cam shaft 58 between the cam body parts 424*a,b*. Movement of the fixed plate 62 longitudinally moves the cam track wall 428 towards or away from the cam track wall 430 so adjusting the width B. It will be appreciated that any embodiment described herein for pin-in-wave or wave-in-wave could be used with the adjustment mechanism 56 to vary the width B.

While the ideal width A is 94% of width B, which holds true for all sizes of cam operated apparatus it has also been found to be the case regardless of the tool and work application the apparatus is used in. It is the remaining parameters of speed of cam rotation, waveform shape and pitch which form the variables that determine the performance of the tool containing the apparatus against any given work task. Broad examples may be for a marine tool, 5 mm pitch at 4,800 rpm; earth moving equipment, 4 mm pitch at 5,000 rpm; retail tools such as chisels and wallpaper strippers, 3 mm pitch at 4,000 rpm and for an ice cutter tool, 2.5 mm pitch at 4,000 rpm.

Figure 13:
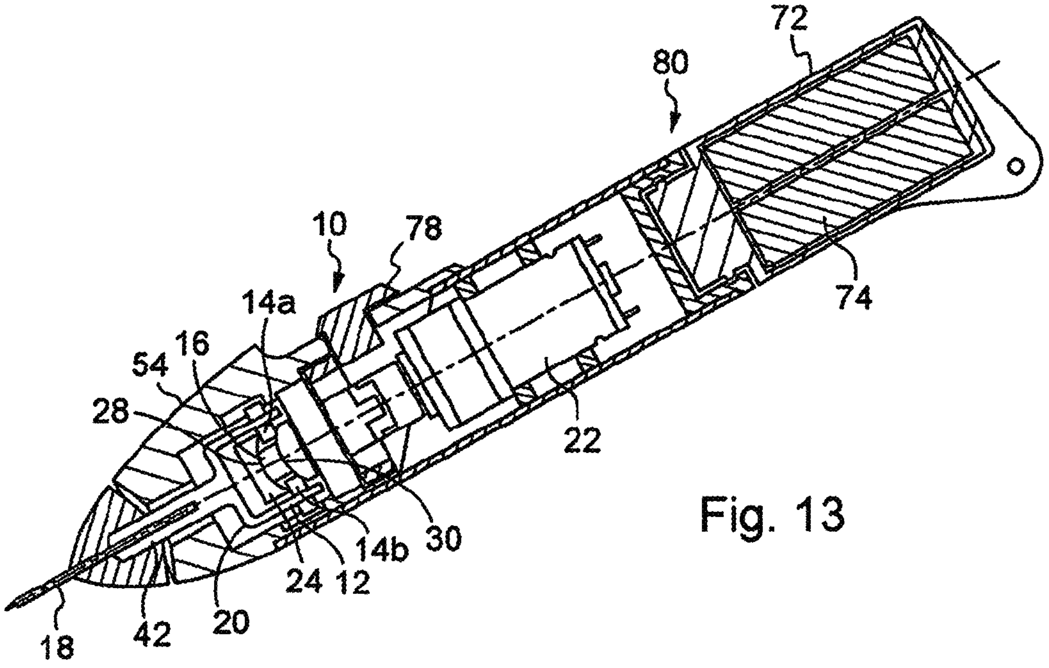
FIG. 13 is a schematic illustration of a handheld power tool according to an embodiment of the present invention.
Figure 14A:
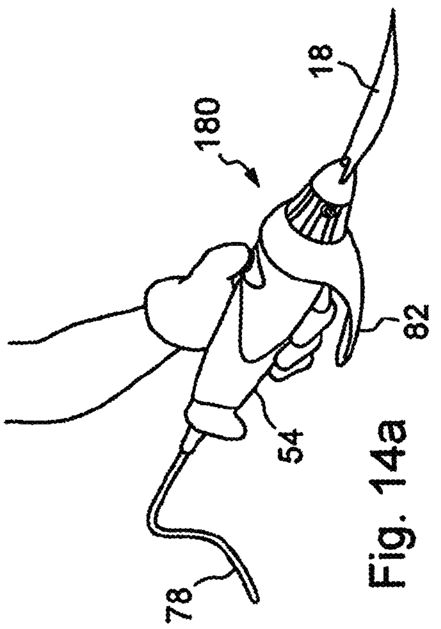
FIGS. 14(*a*)-(*d*) illustrations of marine tools as (a) a retail handheld tool, (b) a heavy duty tool, (c) an ROV compatible tool and (d) crawler compatible tools according to embodiments of the present invention.
Figure 14B:
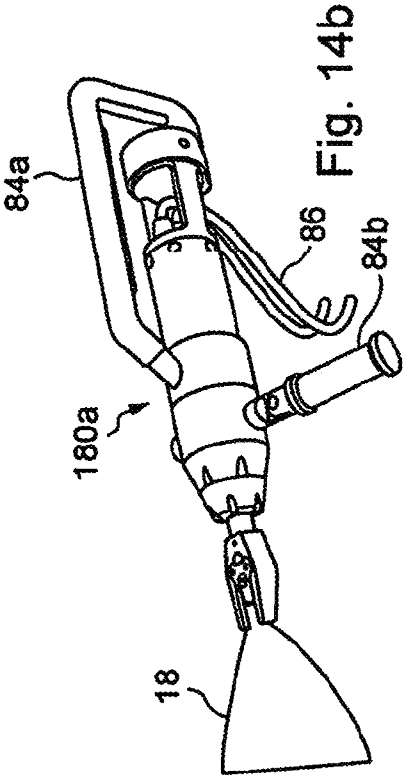
Figure 14C:
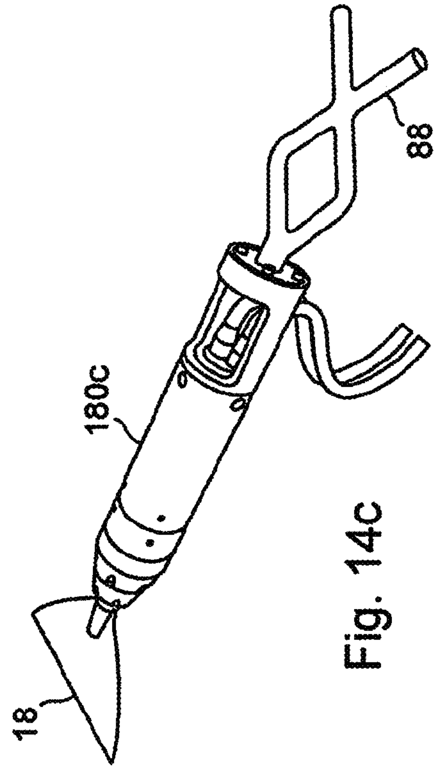
Figure 14D:
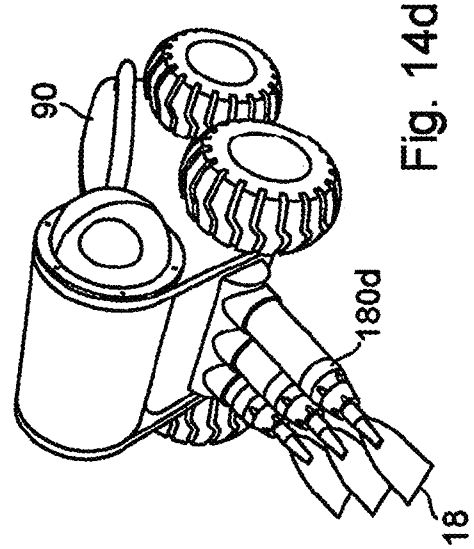
Figure 15A:
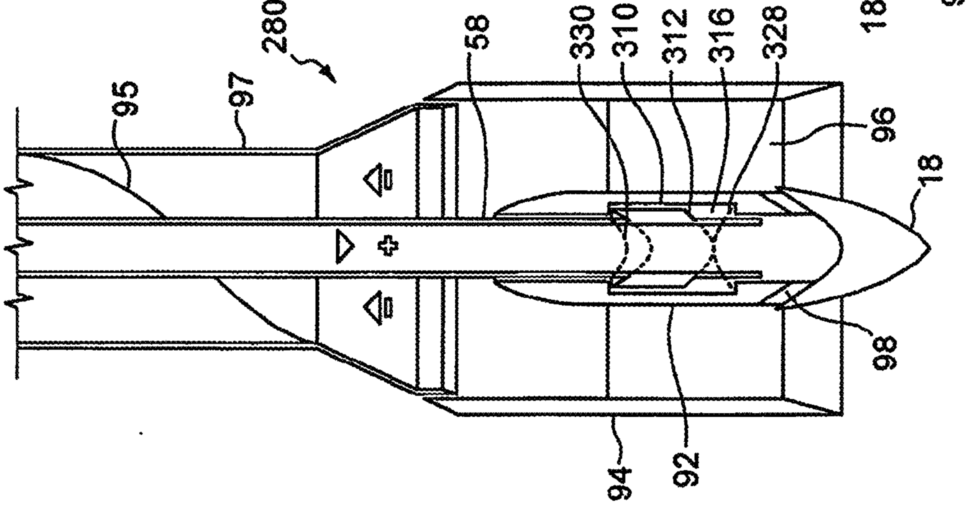
FIGS. 15(*a*)-(*f*) are schematic illustrations of drill tools as (a) with penetrating nose, (b) isometric view of (a), (c) with rotating cutting head, (d) drilling with casing, (e) retractable drill head and (f) disengageable wings and pockets according to embodiments of the present invention.
Figure 15B:
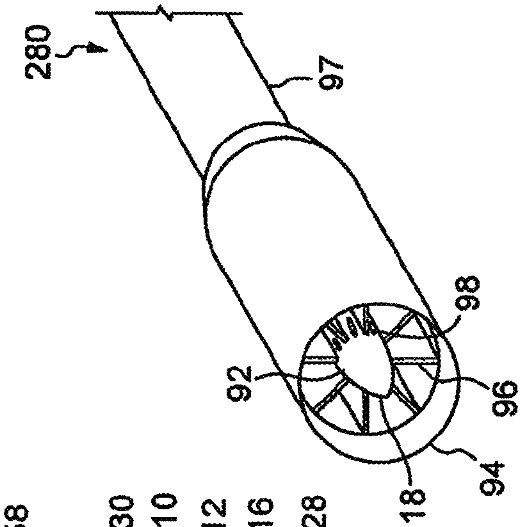
Figure 15C:
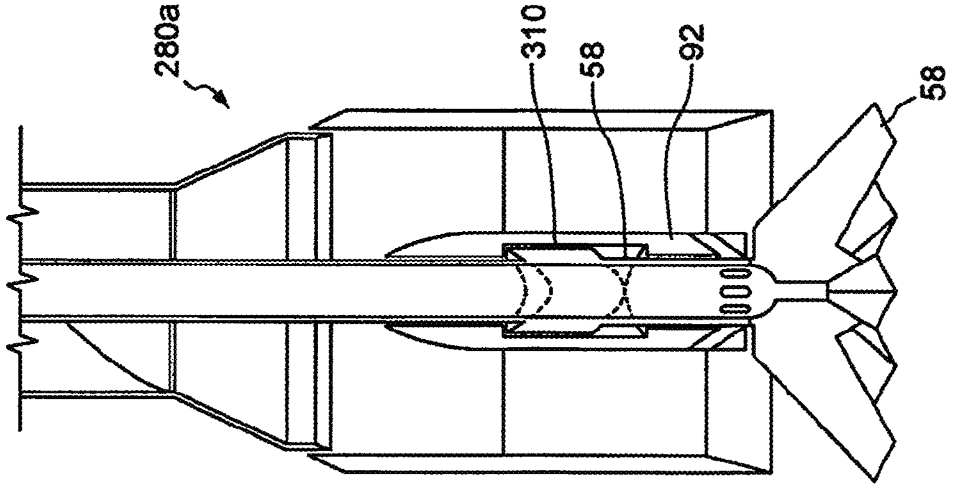
Figures 15D, 15E, 15F:
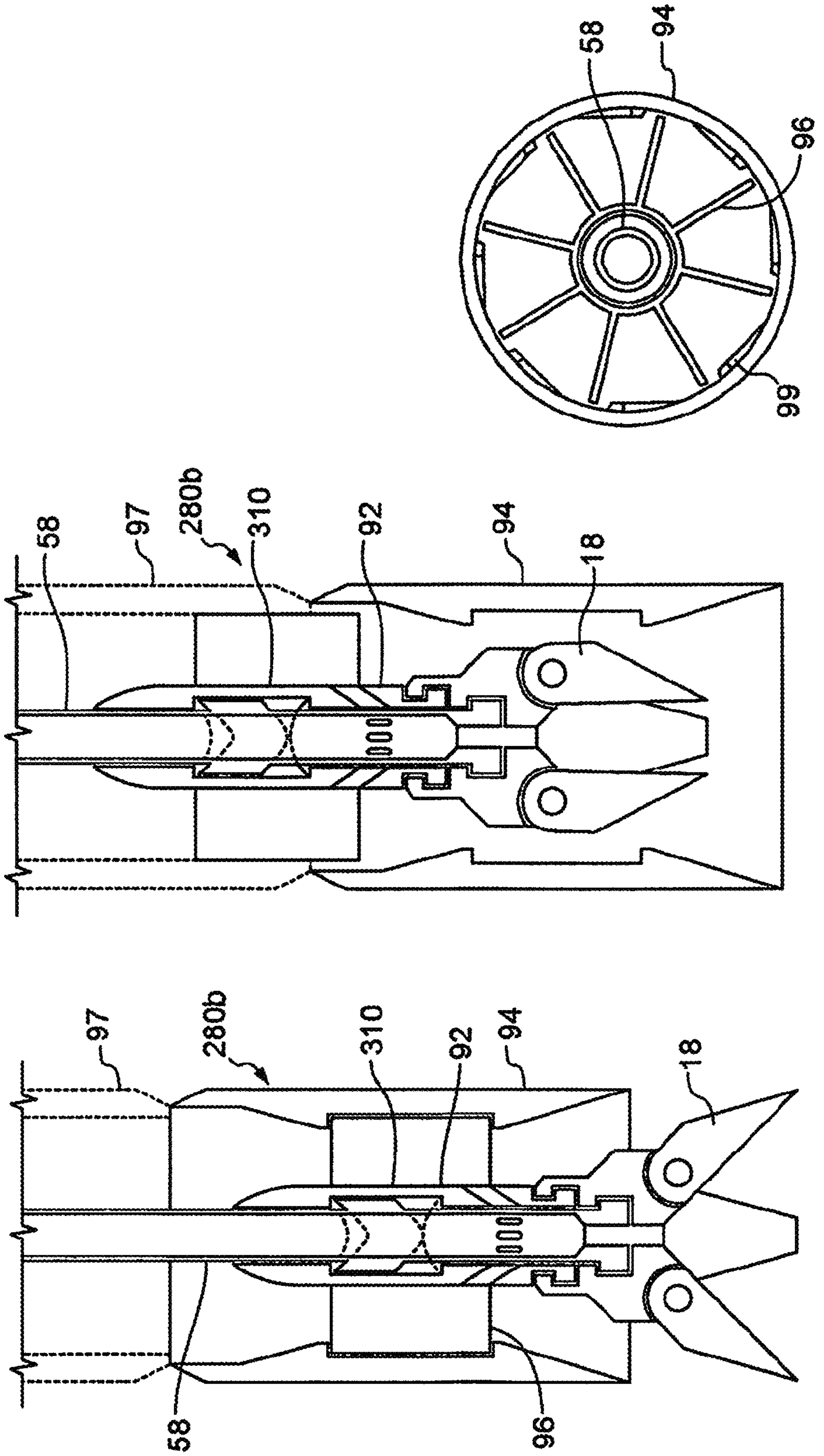

A tool 80 incorporating a cam operated apparatus 10 is illustrated in FIG. 13. Like parts to those in FIG. 1 have been given the same reference numeral to aid clarity. The cam operated apparatus 10 is as described and shown with reference to FIG. 1. Apparatus 10 is now located in housing 54 which is in parts to facilitate easy assembly. At the rear of the tool 80 is a plastic rear bulkhead 72 housing the electrical interface containing batteries 74 but could be a cabled connection to a power supply. The motor 22 and accompanying gearbox is mounted via shock absorbing mountings to aluminium casing as part of the housing to assist in possible heat dissipation. Attached to the output shaft 42 is the head element 18 which is shown as a blade. In certain embodiments of the present invention, a plurality of interchangeable head elements 18 can be provided, in order to adapt the tool 80 for use in different applications. A switch 78, being non-lockable is used to operate the tool 80. In use, depression of the switch 78 turns on the motor 22, this rotates the cam body 24 and causes the pins 14*a,b* of the cam follower 12 to reciprocate longitudinally within the cam track 16. The yoke 20 on which the pins 14*a, c* are attached moves the shaft 42 and consequently the blade, head element 18. While the reciprocating movement is defined by the pitch of the tool 80, the waveform shape of the walls 28,30 and the rpm of the motor 22, an additional harmonic effect will be felt due to the 6% gap between the width A of the cam track 16 and the width B of the cam follower 12. As detailed previously, parameters of the pitch, waveform shape and rpm will be selected to most effectively operate the tool for its intended task. Example parameters for the tools may be a 3 mm pitch at 6,500 rpm. In this embodiment, a wallpaper stripping tool is shown. Tool 80 can be considered as a handyman's or tradesman's tool. Dependent on the parameters and head selected the tool 80 can comprise a scraper, paint stripper, wallpaper stripper, chisel, cold chisel, power spade, hammer, tile remover or the like. It will be appreciated that while the cam operated apparatus 10 is that described in FIG. 1, any of the embodiments of cam operated apparatus and the individual features described herein before, either alone or in combination, could be used in the tool 80.

By making the housing 54 watertight the tool 80 can be sealed from moisture or other hazardous environments. The motor 22 requires no cooling by means of slots or vents in the housing. The tool 80 is therefore adapted to be suitable for use as a marine tool, such as a marine growth or fouling removal tool, barnacle scraper or hull scraper. FIG. 14(*a*) shows a handheld marine power tool 180 suitable for use onshore. The tool 180 can be powered by an external electricity supply, e.g. mains electricity (e.g. 110V/240V) or by a low voltage supply (e.g. 12V), e.g. from a motor vehicle or vessel/boat, shown by the cable 78. Alternatively, the tool may be battery powered. A guard 82 is provided to protect users fingers as they continuously depress the switch 78. FIG. 14(*b*) shows a heavy duty marine tool 180*a* suitable for use onshore or subsurface by a diver. A first handle 84*a* allows easy grip of the tool 180*a* while a second handle 84*b* gives a user two-handed operation to place sufficient load on the head 18 to operate the tool 180*a*. This tool 180*a* may be powered pneumatically through fluid lines 86. These heavy duty tools 180*a* are more likely to use the wave-in-wave cam operated apparatus 110 as it can better provide for the additional loading. The marine tools 180*b* and 180*c* can also be operated autonomously as shown in FIG. 14(*c*) where the handles are removed and an adapter 88 fitted to attach to an ROV (remotely operated vehicle) (not shown) and at FIG. 14(*d*) attachment to a crawler 90. Marine tools 180*b* and 180*c* can therefore be used on underwater structures. It will be appreciated that any of the embodiments of cam operated apparatus and the individual features described herein before, either alone or in combination, could be used in the marine tools 180.

Referring now to FIGS. 15(*a*) and 15(*b*) there is illustrated a drill tool 280 incorporating cam operated apparatus 310 as shown in FIG. 11, according to a further embodiment of the present invention. Drill tool 280 is intended to bore through lightly compacted soil or other material. Drill tool 280 consists of a central pod 92 and an annular shroud 94 which are rigidly joined together by a series of radial wings 96 and from which a penetrating nose protrudes as the head element 18. This assembly surrounds a central rotating drive shaft being the cam shaft 58 for the apparatus 310 and is connected to the cam follower 312. The inner surface of the pod 92 provides the cam track 316 with forward and retreating walls 328,330. In use, a motor at ground level will rotationally drive the cam shaft 58. The shroud 94 surrounding the pod 92 is naturally restrained from rotating under the influence of the drive shaft 58 and cam operated apparatus 310 by direct contact with the soil or medium to be drilled through. The motion of the shroud 94, radial wings 96 and central pod 94 is therefore constrained to reciprocate vertically so allowing the cam operated apparatus 310 to develop the harmonic like action. This motion aids penetration of the drill tool 280. The drive shaft 58 is hollow to allow the passage of pressurised water or drilling fluid to exit ejector outlets 98 in the nose of the pod 92. This action assists the rate of penetration of the tool 280 and removes debris by circulating it up the inside of the annular shroud 94 to an outer debris removal tube 97, not attached to the shroud 94, and up to surface. The drive shaft 58 also revolves the outer debris removal tube 97 which is equipped with a long pitch Archimedes screw 95 to further assist with the removal of debris from the tool 280.

FIG. 15(*c*) shows a modified drill tool 280*a* in which the head element 18 is now attached to the drive shaft 58 and is independent of the pod 92. Head element 18 is now a cutting head as is known in the industry. Drill tool 280*a* operates as for drill tool 280 except in that the head element, cutting head 18 will rotate. By adding a cutting head driven by an extension of the drive shaft this enhances the penetration of the tool 280. The cutting heads can be changed to best suit the work conditions. The drill tool 280*b* as shown in FIGS. 15(*d*) to 15(*f*) is intended to address deeper bore holes through more resilient material such as oil, gas or water wells. The cam operated apparatus 310 is as before. The central pod 92 with fixed radial wings 96, now has the wings being free from the shroud 94 but engaging with pockets 99 formed in the inner face of the annular shroud 94 when the drive shaft 58 is rotated. The outer debris removal tube 97 is now replaced with sections of liner or casing needed to line the bored hole.

The head element 18 is again connected to the drive shaft 58 to rotate and is a drill bit of the collapsible/retractable blade type configured to best suit the work and can disengage with the shroud pockets 99 when rotated in reverse from the normal drilling rotation direction, as illustrated in FIG. 15(*f*). In use, the drill bit is rotated while the pod 92, wings 96 and shroud 94 reciprocate with the additional harmonic action and the drill tool 280*b* penetrates the material and forms a borehole. By closely following the tool 280*b* with sections of the well liner 97 thus making drilling and casing insertion the one operation, akin to the recognised casing while drilling operations. On completion of task, the drive shaft 58 is rotated in reverse, the wings 96 disengage from the pockets 99, the blades on the drill bit are retracted and the retractable drill head 18, pod 92, wings 96 and cam operated apparatus 310 can then be withdrawn from the bore hole, leaving the shroud 94 at the bottom of the liner 97.

More detailed descriptions of the drill tools 280 can be found in WO2009/027678 which is incorporated herein by reference. It will be appreciated that any of the embodiments of cam operated apparatus and the individual features described herein before, either alone or in combination, could be used in the drill tools 280.

Figure 16B:
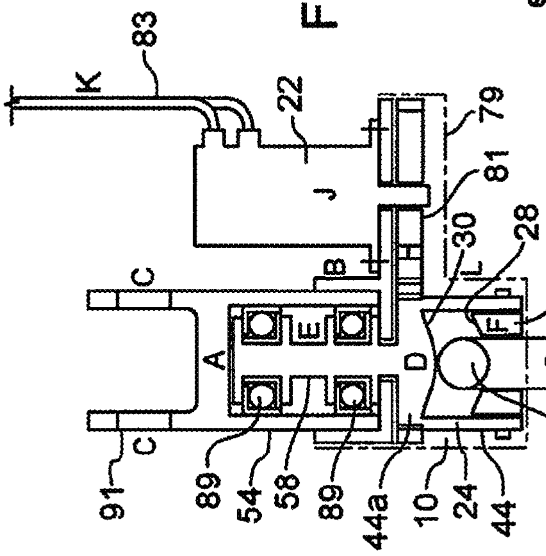
FIGS. 16(*a*)-(*c*) are schematic illustrations of a (a) bucket tool of an excavator with (b) a cam operated apparatus with motor and (c) gear arrangement according to an embodiment of the present invention.
Figure 16C:
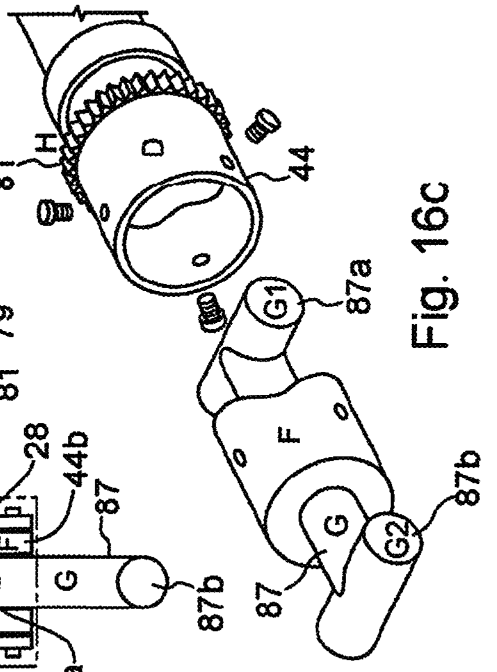
Figure 16A:
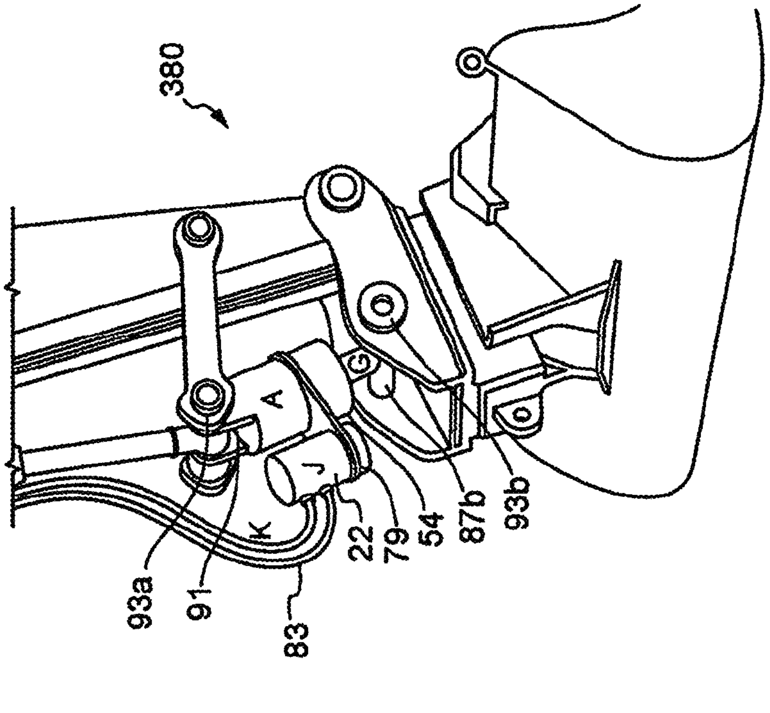

FIG. 16(*a*) to (*c*) illustrate a tool 380 in the form of a bucket of an excavator (not shown) including a cam operated apparatus 10. Essentially, one of the articulating links in a conventional bucket mechanism is replaced with the cam operated apparatus 10. To achieve this the outer casing/housing 54 has pivot points 91 set in its upper surface to engage with the existing link attachment points 93*a*. Cam shaft 58 is supported by ball races 89 and connected to the first part 44*a* of the cylindrical body 24 carrying the retreating cam track wall 30. The cam drum 44, see FIG. 11, is arranged to hold the lower part 44*b* of the cylindrical body 24 to the upper part 44*a*, with the cam track walls 28,30 separated by the width B. Caught between the walls 28,30 is the cross part 87*a* of the central shaft 87 acting as the cam follower 12 such that as the cam drum 44 rotates the shaft 87 is forced to move in a reciprocal fashion. The bottom part of the central shaft 87*b* is secured in existing pivots 93*b* set into the bucket neck. The motive power used to rotate the cam drum 44 is provided by a hydraulic motor 22 and its connecting lines 83. The motor 22 acts on the cam shaft 58 by means of intermeshing gears 81, one gear set being an integral part of the cam shaft 58 and the other fixed to the motor drive shaft. An outer shield 79 is provided to keep water and debris out of the apparatus 10.

As the rotating cam drum 44 causes the shaft 87 to reciprocate, this in turn causes the bucket of the excavator to vibrate and so ease the passage of the bucket into the medium to be moved. Experiments already conducted with smaller blades indicate a required speed for the cam rotation to be 3,000 to 4,000 rpm. Since each rotation of the cam imparts two reciprocal movements to the shaft 87, it follows that the shaft moves at 6,000 to 8,000 cycles per minute. A pitch of no more than 5 mm has been found to be sufficient to give the range of physical movement needed at the cutting edge of the bucket. The vibration motor 22 need not be active all the time but could be triggered automatically only when the bucket encounters resistance. It will be recognised that the bucket could be any blade work head of any earth moving machine provided at a frequency sufficient to ease its passage through a granular medium such as earth, sand, etc. It will be appreciated that any of the embodiments of cam operated apparatus and the individual features described herein before, either alone or in combination, could be adapted for use in the bucket tool 380.

Figure 17A:
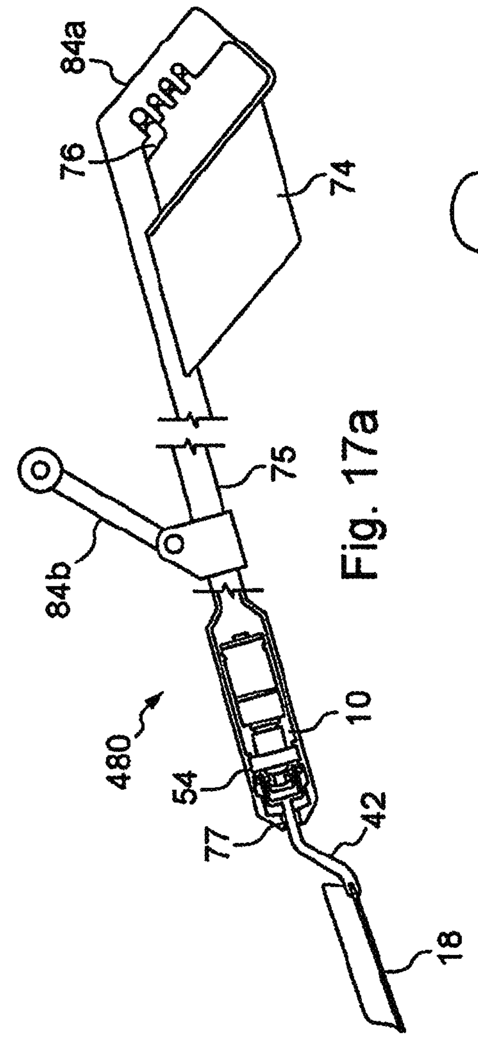
FIGS. 17(*a*)-(*c*) are (a) schematic illustration of a powered spade tool, (b) a powered spade tool in use and (c) a powered spade tool with back pack according to embodiments of the present invention.
Figure 17B:
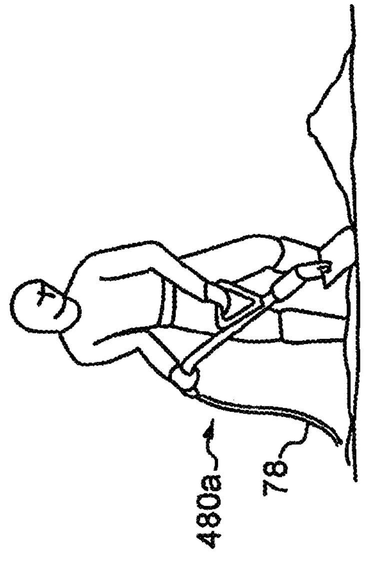
Figure 17C:
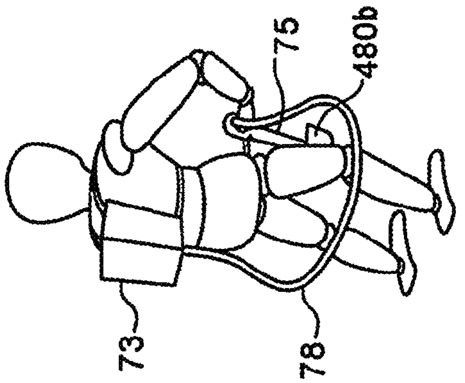

A tool 480 in the form of a powered spade can then be realised from the bucket tool 380. Referring to FIG. 17(*a*) there is illustrated a powered spade 480 which uses the cam operated mechanism 10 as described with reference to the power tool 80 in FIG. 13(*a*). In this embodiment, the output shaft 42 is canted to provide ergonomic benefit when using the spade as the head element 18 attached thereto. Any type of spade or shovel can be used but advantageously it can be lightweight due to the loading and reciprocal with harmonic motion imparted upon it. Due to the outdoor use a water seal bearing 77 is located between the shaft 42 and housing 54. A spade shaft 75 supports the apparatus 10 with a first handle 84*a* at an end thereof and a second handle 84*b* which may be an adjustable fore handle to provide extra control in use. Power to drive the apparatus 10 is provided by a detachable rechargeable lithium battery pack 74 located at the first handle 84*a* with the operating switch/trigger 76 which may be lockable for use. Use is seen in FIG. 17(*b*) where the powered spade tool 480*a* is powered via an electrical cable 78 to a remote power supply such as mains. FIG. 17(*c*) shows an alternative power source in the form of a back pack 73 carrying the batteries 74 and cabled 78 to the spade shaft 73 of powered spade 480*b*. This arrangement allows longer use outdoors in remote locations. The reciprocating motion with the harmonic effect means that the blade 18 requires little or no effort to penetrate the medium. It further assists in allowing the worker to maintain their balance as it removes the requirement to lift a foot and step on the edge of the blade so that both feet can be in contact with the ground all the time. Bending by the worker is also substantially reduced as the spade motion is more akin to scooping than conventional digging. It will be appreciated that any of the embodiments of cam operated apparatus and the individual features described herein before, either alone or in combination, could be used in the powered spade tools 480.

Figure 18B:
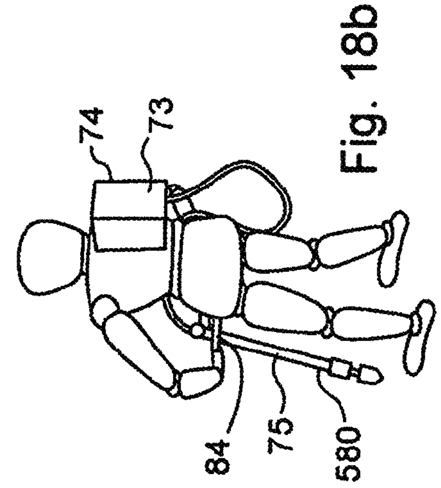
FIGS. 18(*a*) and 18(*b*) are (a) schematic illustration of a planting dibber tool, and (b) a planting dibber tool in use.
Figure 18A:
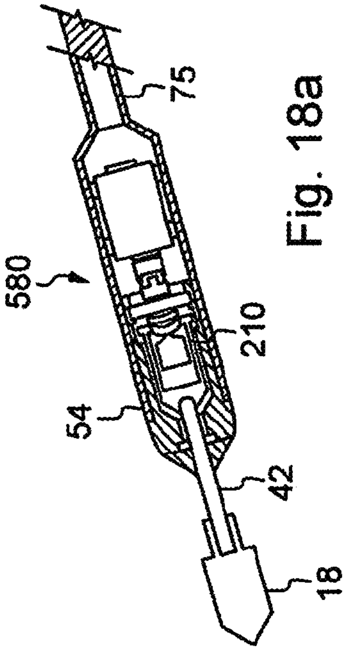

The design of the powered spade tool 480 lends itself to adaptation to form a powered tree planting dibber tool 580. Such a tool 580 is illustrated in FIGS. 18(*a*) and 18(*b*). A cam operating apparatus 210 is mounted in a housing 54 at the end of a shaft 75. The output shaft 42 is now connected to an element head 18 which is a dibber. Dibbers have substantially cylindrical bodies with a pointed end which is driven into soil to create a recess into which a tree sapling is dropped. In this powered tool the shaft provides a handle 84 perpendicular to the shaft so that in use, see FIG. 18(*b*), the tool 580 is held vertically and the dibber pushed into the ground. The reciprocal motion and harmonic effect on the dibber head 18, ease the penetration of the dibber head 18 into soil and thus speeds up the tree planting process. As for the powered spade tool 480, the power can be via batteries at the handle (not shown) or batteries 74 carried in a back pack 73 worn by the user. It will be appreciated that any of the embodiments of cam operated apparatus and the individual features described herein before, either alone or in combination, could be used in the tree planting dibber 580.

Figure 19B:
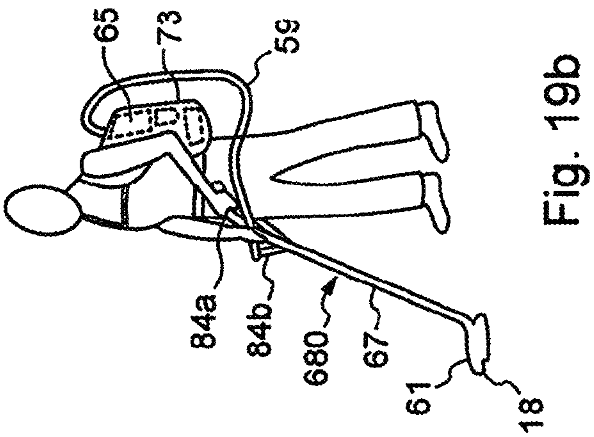
FIGS. 19(*a*) and 19(*b*) are schematic illustrations of an adhered substance removal tool illustrating (a) operating head and (b) the tool in use according to embodiments of the present invention.
Figure 19A:
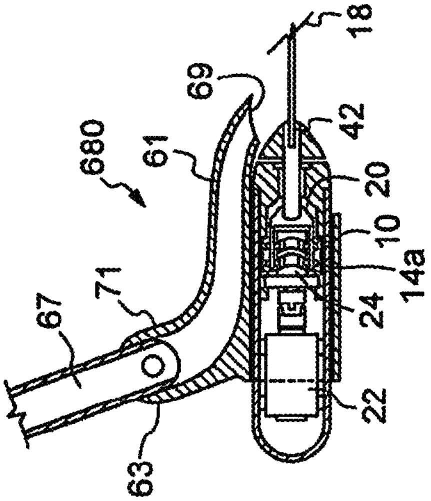

An adhered substance removal tool 680 will now be described with reference to FIGS. 19(*a*) and 19(*b*). In FIG. 19(*a*) the working head 61 is shown having a cam operating apparatus 10 located in a housing 54 constructed of aluminium to dissipate heat. The apparatus 10 operates as described for FIG. 1 but shows the use of twin cam followers as described in FIG. 7. The output shaft 42 connects to the head element 18 in the form of a blade used to scrape adhered substances such as chewing gum and the like off a surface. It will be recognised that with a cabled power supply (not shown), this arrangement is most similar to the wallpaper stripper power tool 80 described hereinbefore. The tool 680 has additional features in the form of a suction extractor 71 arranged with an opening 69 beside the blade 18 to catch and remove detached substance. The substance travels up a hollow shaft 67 and as seen in FIG. 19(*b*) is deposited into a receptacle 65. In this embodiment the receptacle 65 is located in a back pack 73, along with the suction equipment which may be based on that used for vacuum cleaners. A rotating lockable joint 63 on the shaft 67 provides angle adjustment to the working head 61. Handles 84*a,b* as for the powered spade tool 480*a* are provided on the shaft 67. The back pack 73 can also advantageously hold the batteries used to power the apparatus 10 and rotate the cam body 24. In use the user wears the back pack 73, arranges working head 61 against the floor adjusting joint 63 as necessary. Turning on the power will cause the motor 22 to rotate the cam body 24 and movement of the cam follower pins 14*a-d* in a reciprocating manner with the harmonic effect added. This movement is transmitted to the blade 18 via the yoke 20 and output shaft 42, improving the rate of removal of the substance from the surface. The detached substance is sucked into opening 69 and up the shaft 67, via hose 59 to the receptacle 65 in the back pack 73. A user can therefore walk around streets, pavements and buildings removing chewing gum and the like from the ground with it being automatically collected in a unit for later disposal. It will be appreciated that any of the embodiments of cam operated apparatus and the individual features described herein before, either alone or in combination, could be used in the adhered substance removal tool 680.

Figure 20A:
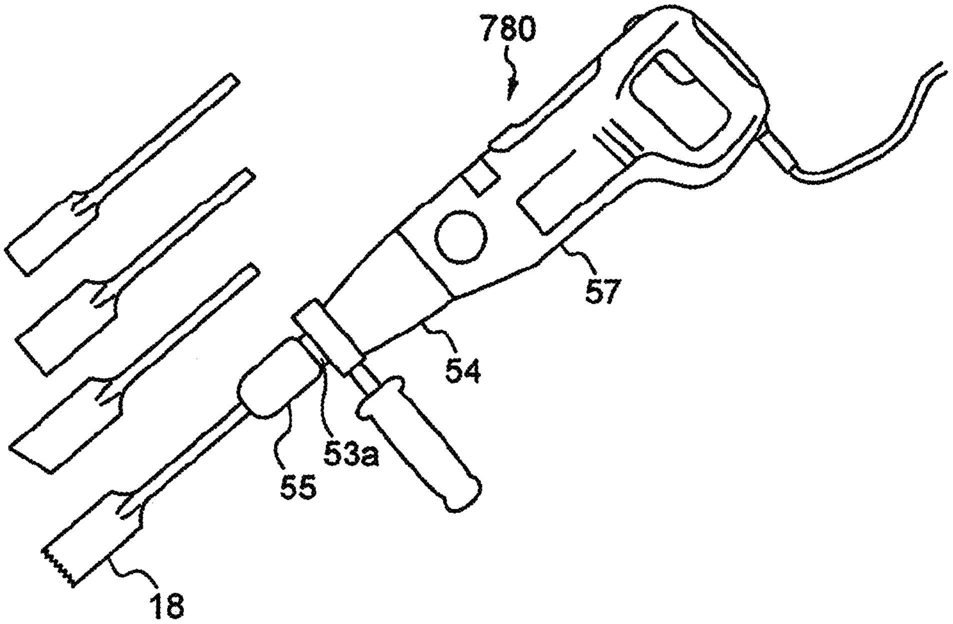
FIGS. 20(*a*) and 20(*b*) are schematic illustrations of a cement/render breaker tool showing (a) isometric view and (b) a cross-sectional view according to an embodiment of the present invention.
Figure 20B:
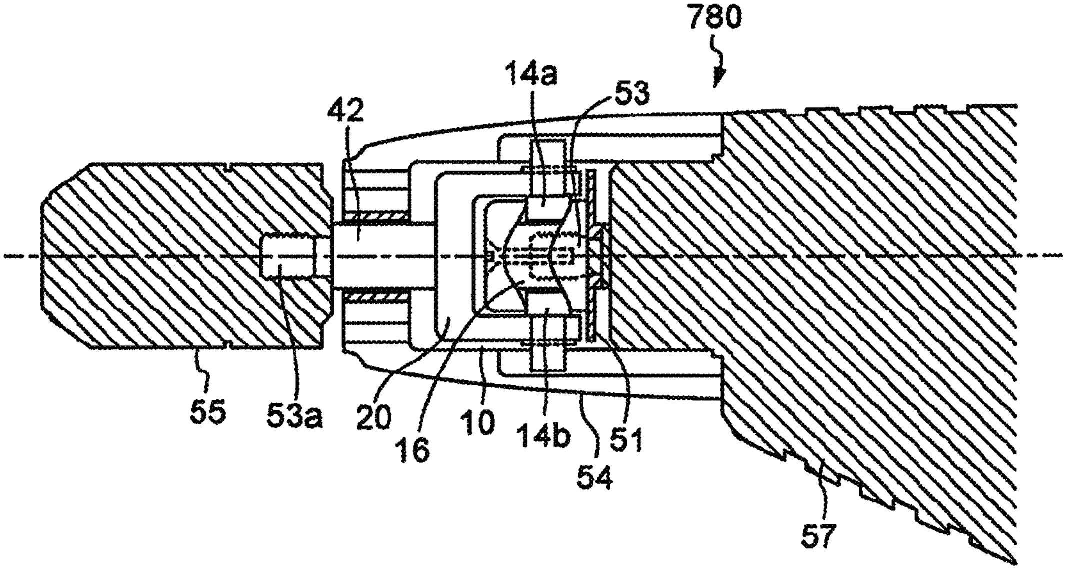

Referring now to FIGS. 20(*a*) and 20(*b*) of the drawings there is illustrated a concrete/render breaker tool 780 according to a further embodiment of the present invention. Tool 780 is formed of a standard known handheld power drill 57 in which a cam operating apparatus 10 in a housing 54 is located behind the drill chuck 55. The drive shaft connection 53 of the power drill 57 is connected to the cylindrical body 24 so that when the power drill 57 is switched on the cam tracks 16 on the body 24 will rotate at the rpm of the power drill 57. A fan 51 can be mounted on the rotating connection 53 to provide cooling. Cam follower pins 14*a,b* located in the cam track 16 are connected to a yoke 20 which becomes the output shaft 42. A second drive shaft connection 53*a* is located on the end of the output shaft 42. The drill chuck 55 is then connected as before but now to the second drive shaft connection 53*a*. An interchangeable head element 18 such as a chisel is located in the drill chuck 55. Now when the power drill 57 is turned on and the chisel head 18 located against a substance such as concrete/render instead of rotating the chisel head 18 will reciprocate longitudinally with the additional harmonic and provide a hammer like action to break up the concrete/render. It will be appreciated that any of the embodiments of cam operated apparatus and the individual features described herein before, either alone or in combination, could be used in the concrete/render breaker tool 780.

The principal advantage of at least one embodiment of the present invention is that it provides cam operating apparatus in which the cam follower width is between 91% and 99% of the cam track width, resulting in two controlled, confined and bounded degrees of movement creating a harmonic like effect on the reciprocal motion of a shaft.

A further advantage of at least one embodiment of the present invention is that it provides a tool including the cam operating apparatus which has lower vibration and is more energy efficient than the prior art.

A still further advantage of at least one embodiment of the present invention is that it provides a tool including the cam operating apparatus which by selecting the cam follower width to cam track width ratio, the rpm of the drive of the cam and the pitch can be adapted to best suit a range of work operations for the tool.

It will be appreciated by those skilled in the art that various modifications may be made to the embodiments described herein while remaining within the scope of the claims appended hereto. For example, while only a single adjustment mechanism has been described for varying the cam track width other arrangements not employing an eccentric cam could equally be used.

I claim:

1. Cam operated apparatus comprising a cam track and cam follower means, wherein the cam track and cam follower means are engaged with one another, and the apparatus further comprises at least one head element operatively connected to one of the at least one cam track and the at least one cam follower means, and at least one rotational drive means operatively connected to the other of the at least one cam track and the at least one cam follower means, such that rotational drive causes reciprocal action of the head element along a first axis and wherein the cam track has a width measured along the first axis and the cam follower means has a width measured along the first axis and characterised in that: the maximum width of the cam follower means is configured to be in the region of 91% to 99%, of the minimum width of the cam track to provide the cam follower means with two degrees of motion, a first degree of motion defined by the cam track, and a second degree of motion defined by ricochet between opposing walls of the cam track, the first degree of motion causing a substantially longitudinally throw of the head element providing a pitch of the apparatus and the second degree of motion creating a harmonic effect on the head element, and the harmonic effect having a sweet spot at a value between the 91% to 99% dependent upon the pitch and the rotational drive speed.

2. Cam operated apparatus according to claim 1 wherein the cam follower means is adapted to run in the cam track.

3. Cam operated apparatus according to claim 1 wherein the cam track comprises a closed track on a cam cylinder body, the cam track comprises a first cam track wall means facing a second cam track wall means, the first cam track wall provides a first cam track waveform and the second cam track wall means provides a second cam track wave or waveform and wherein the first cam track waveform and the second cam track waveform are sinusoidal and in phase.

4. Cam operated apparatus according to claim 1 wherein the cam track comprises a closed track on a cam cylinder body, the cam track comprises a first cam track wall means facing a second cam track wall means, the first cam track wall provides a first cam track waveform and the second cam track wall means provides a second cam track wave or waveform and wherein the first cam track waveform and the second cam track waveform are sinusoidal and out of phase.

5. Cam operated apparatus according to claim 1 wherein the cam follower means comprise at least two pins adapted to locate within the cam track.

6. Cam operated apparatus according to claim 5 wherein the at least two pins each include a freely rotating roller bearing.

7. Cam operated apparatus according to claim 1 wherein the cam track comprises a closed track on a cam cylinder body, the cam track comprises a first cam track wall means facing a second cam track wall means, the first cam track wall provides a first cam track waveform and the second cam track wall means provides a second cam track wave or waveform and wherein the first cam track waveform has a sharper extended rise than the second cam track waveform.

8. Cam operated apparatus according claim 1 wherein the cam follower means comprises a first cam follower wall means and a second cam follower wall means in opposed relationship, the first cam follower wall means providing a first cam follower waveform and the second cam follower wall means providing a second cam follower waveform.

9. Cam operated apparatus according to claim 8 wherein the cam track comprises a first cam track wall means facing a second cam track wall means, the first cam track wall provides a first cam track waveform and the second cam track wall means provides a second cam track wave or waveform and the first cam follower wall means faces the first cam track wall means and the second cam follower wall means faces the second cam track wall means.

10. Cam operated apparatus according to claim 8 wherein the first cam follower waveform and the second cam follower waveform are sinusoidal and in phase.

11. Cam operated apparatus according to claim 8 wherein at least two pins are located colinearly with the first cam follower wall means and the second cam follower wall means.

12. Cam operated apparatus according to claim 8 wherein all of the waveforms have the same frequency and amplitude: peaks of the first and second cam track waveforms are circumferentially or radially coincident or longitudinally face one another; troughs of the first and second cam track waveforms are circumferentially radially coincident or longitudinally face one another; peaks of the first and second cam follower waveforms are circumferentially or radially coincident or longitudinally oppose one another being in-phase; and troughs of the first and second cam follower waveforms are circumferentially or radially coincident or longitudinally oppose one another being in-phase.

13. Cam operated apparatus according to claim 12 wherein the waveforms have two peaks and two troughs.

14. Cam operated apparatus according to claim 8 wherein: the first and second cam track waveforms have the same frequency and amplitude; the first and second cam follower waveforms have the same frequency and amplitude; the frequency and amplitude of the first and second cam track waveforms are smaller than the frequency and amplitude of the first and second cam follower waveforms; the first and second cam track waveforms are out of phase with peaks of the first cam track waveform being radially coincident or longitudinally opposing troughs of the second cam track waveform; the first and second cam follower waveforms are in-phase with peaks and troughs of the first and second cam follower waveforms being circumferentially or radially coincident or longitudinally opposing peaks and troughs, respectively.

15. Cam operated apparatus according to claim 8 wherein a distance between a peak of the first cam track waveform and a trough of the second cam track waveform may be twice the distance between peaks of the first and second cam follower waveforms.

16. Cam operated apparatus according to claim 8 wherein sides or walls of the cam track and/or the cam follower wall means are non-parallel.

17. Cam operated apparatus according to claim 1 wherein there is a plurality of cam tracks and cam follower means.

18. Cam operated apparatus according to claim 1 wherein the rotational drive means is a motor.

19. Cam operated apparatus according to claim 1 wherein the head element is a blade.

20. Cam operated apparatus comprising a cam track and cam follower means, wherein the cam track and cam follower means are engaged with one another, and the apparatus further comprises at least one head element operatively connected to one of the at least one cam track and the at least one cam follower means, and at least one rotational drive means operatively connected to the other of the at least one cam track and the at least one cam follower means, such that rotational drive causes reciprocal action of the head element along a first axis and wherein the cam track has a width measured along the first axis and the cam follower means has a width measured along the first axis and characterised in that: the maximum width of the cam follower means is 94%, of the minimum width of the cam track to provide the cam follower means with two degrees of motion, a first degree of motion defined by the cam track, and a second degree of motion defined by ricochet between opposing walls of the cam track, the first degree of motion causing a substantially longitudinally throw of the head element providing a pitch of the apparatus and the second degree of motion creating a harmonic effect on the head element, and the harmonic effect having a sweet spot at the value of 94%.

* * * * *